(12) United States Patent
Adams

(10) Patent No.: US 11,765,445 B2
(45) Date of Patent: *Sep. 19, 2023

(54) VALIDATION OF CONTENT

(71) Applicant: Comcast Cable Communications Management, LLC, Philadelphia, PA (US)

(72) Inventor: Glenn Adams, Boulder, CO (US)

(73) Assignee: Comcast Cable Communications Management, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/586,432

(22) Filed: Jan. 27, 2022

(65) Prior Publication Data

US 2022/0159351 A1 May 19, 2022

Related U.S. Application Data

(63) Continuation of application No. 16/740,921, filed on Jan. 13, 2020, now Pat. No. 11,272,265, which is a
(Continued)

(51) Int. Cl.
*H04N 21/8545* (2011.01)
*H04N 21/235* (2011.01)
(Continued)

(52) U.S. Cl.
CPC ....... *H04N 21/8545* (2013.01); *G06F 40/143* (2020.01); *G06F 40/146* (2020.01);
(Continued)

(58) Field of Classification Search
CPC ............ H04N 21/8545; H04N 21/235; H04N 21/25891; H04N 21/4349; H04N 21/435;
(Continued)

(56) References Cited

U.S. PATENT DOCUMENTS 5,287,489 A 2/1994 Nimmo et al.
5,321,750 A 6/1994 Nadan
(Continued)

FOREIGN PATENT DOCUMENTS

EP 0624039 A2 11/1994
EP 0963115 A1 12/1999
(Continued)

OTHER PUBLICATIONS

Fernando Pereira, "The MPEG-4 Book", Prentice Hall, Jul. 10, 2002.
(Continued)

*Primary Examiner* — Keith D Bloomquist
(74) *Attorney, Agent, or Firm* — Banner & Witcoff, Ltd.

(57) ABSTRACT

A collection of well-formed, but possibly semantically invalid, binary encoded multimedia data components or packages as well as the binary encoded announcement, signaling, and interchange protocols used in their transmission are converted into one or more well-formed extensible markup language (XML) files. Such XML files may then be validated according to one or more pre-defined XML schemas, or similar schema languages, in order to verify that the data and protocol structures and substructures adhere to prior defined semantic constraints.

21 Claims, 28 Drawing Sheets

Related U.S. Application Data continuation of application No. 16/119,184, filed on Aug. 31, 2018, now Pat. No. 10,575,070, which is a continuation of application No. 15/147,336, filed on May 5, 2016, now Pat. No. 10,110,973, which is a continuation of application No. 12/877,492, filed on Sep. 8, 2010, now Pat. No. 9,414,022, which is a continuation of application No. 11/381,508, filed on May 3, 2006, now Pat. No. 7,818,667, which is a continuation-in-part of application No. 11/253,892, filed on Oct. 18, 2005, now Pat. No. 7,805,746.

(60) Provisional application No. 60/677,759, filed on May 3, 2005.

(51) Int. Cl.
| | |
|---|---|
| *H04N 21/258* | (2011.01) |
| *H04N 21/434* | (2011.01) |
| *H04N 21/435* | (2011.01) |
| *H04N 21/443* | (2011.01) |
| *H04N 21/466* | (2011.01) |
| *H04N 21/81* | (2011.01) |
| *H04N 21/84* | (2011.01) |
| *G06F 40/226* | (2020.01) |
| *G06F 40/143* | (2020.01) |
| *G06F 40/151* | (2020.01) |
| *G06F 40/146* | (2020.01) |
| *H04N 7/173* | (2011.01) |

(52) U.S. Cl.
CPC .......... *G06F 40/151* (2020.01); *G06F 40/226* (2020.01); *H04N 7/17309* (2013.01); *H04N 21/235* (2013.01); *H04N 21/25891* (2013.01); *H04N 21/435* (2013.01); *H04N 21/4349* (2013.01); *H04N 21/443* (2013.01); *H04N 21/466* (2013.01); *H04N 21/812* (2013.01); *H04N 21/84* (2013.01)

(58) Field of Classification Search
CPC .. H04N 21/443; H04N 21/466; H04N 21/812; H04N 21/84; H04N 7/17309; G06F 40/14
See application file for complete search history.

(56) References Cited

U.S. PATENT DOCUMENTS

| | | |
|---|---|---|
| 5,353,121 A | 10/1994 | Young et al. |
| 5,485,221 A | 1/1996 | Banker et al. |
| 5,521,841 A | 5/1996 | Arman et al. |
| 5,530,939 A | 6/1996 | Mansfield, Jr. et al. |
| 5,583,563 A | 12/1996 | Wanderscheid et al. |
| 5,589,892 A | 12/1996 | Knee et al. |
| 5,592,551 A | 1/1997 | Lett et al. |
| 5,594,509 A | 1/1997 | Florin et al. |
| 5,613,057 A | 3/1997 | Caravel |
| 5,621,456 A | 4/1997 | Florin et al. |
| 5,657,072 A | 8/1997 | Aristides et al. |
| 5,659,793 A | 8/1997 | Escobar et al. |
| 5,666,645 A | 9/1997 | Thomas et al. |
| 5,675,752 A | 10/1997 | Scott et al. |
| 5,694,176 A | 12/1997 | Bruette et al. |
| 5,737,552 A | 4/1998 | Lavallee et al. |
| 5,802,284 A | 9/1998 | Karlton et al. |
| 5,826,102 A | 10/1998 | Escobar et al. |
| 5,844,620 A | 12/1998 | Coleman et al. |
| 5,850,218 A | 12/1998 | LaJoie et al. |
| 5,852,435 A | 12/1998 | Vigneaux et al. |
| 5,860,073 A | 1/1999 | Ferrel et al. |
| 5,883,677 A | 3/1999 | Hofmann |
| 5,892,902 A | 4/1999 | Clark |
| 5,892,905 A | 4/1999 | Brandt et al. |
| 5,905,492 A | 5/1999 | Straub et al. |
| 5,929,849 A | 7/1999 | Kikinis |
| 5,945,987 A | 8/1999 | Dunn |
| 5,960,194 A | 9/1999 | Choy et al. |
| 5,990,890 A | 11/1999 | Etheredge |
| 5,996,025 A | 11/1999 | Day et al. |
| 6,002,394 A | 12/1999 | Schein et al. |
| 6,005,561 A | 12/1999 | Hawkins et al. |
| 6,008,083 A | 12/1999 | Brabazon et al. |
| 6,008,803 A | 12/1999 | Rowe et al. |
| 6,008,836 A | 12/1999 | Bruck et al. |
| 6,016,144 A | 1/2000 | Blonstein et al. |
| 6,025,837 A | 2/2000 | Matthews, III et al. |
| 6,038,560 A | 3/2000 | Wical |
| 6,049,823 A | 4/2000 | Hwang |
| 6,061,695 A | 5/2000 | Slivka et al. |
| 6,067,108 A | 5/2000 | Yokote et al. |
| 6,088,722 A | 7/2000 | Herz et al. |
| 6,091,411 A | 7/2000 | Straub et al. |
| 6,094,237 A | 7/2000 | Hashimoto |
| 6,141,003 A | 10/2000 | Chor et al. |
| 6,148,081 A | 11/2000 | Szymanski et al. |
| 6,162,697 A | 12/2000 | Singh et al. |
| 6,169,543 B1 | 1/2001 | Wehmeyer |
| 6,172,677 B1 | 1/2001 | Stautner et al. |
| 6,177,931 B1 | 1/2001 | Alexander et al. |
| 6,191,781 B1 | 2/2001 | Chaney et al. |
| 6,195,692 B1 | 2/2001 | Hsu |
| 6,205,582 B1 | 3/2001 | Hoarty |
| 6,219,839 B1 | 4/2001 | Sampsell |
| 6,239,795 B1 | 5/2001 | Ulrich et al. |
| 6,240,555 B1 | 5/2001 | Shoff et al. |
| 6,281,940 B1 | 8/2001 | Sciammarella |
| 6,292,187 B1 | 9/2001 | Gibbs et al. |
| 6,292,827 B1 | 9/2001 | Raz |
| 6,295,057 B1 | 9/2001 | Rosin et al. |
| 6,314,569 B1 | 11/2001 | Chernock et al. |
| 6,317,885 B1 | 11/2001 | Fries |
| 6,345,305 B1 | 2/2002 | Beck et al. |
| 6,405,239 B1 | 6/2002 | Addington et al. |
| 6,415,438 B1 | 7/2002 | Blackketter et al. |
| 6,421,067 B1 | 7/2002 | Kamen et al. |
| 6,426,779 B1 | 7/2002 | Noguchi et al. |
| 6,442,755 B1 | 8/2002 | Lemmons et al. |
| 6,477,705 B1 | 11/2002 | Yuen et al. |
| 6,486,920 B2 | 11/2002 | Arai et al. |
| 6,522,342 B1 | 2/2003 | Gagnon et al. |
| 6,529,950 B1 | 3/2003 | Lumelsky et al. |
| 6,530,082 B1 | 3/2003 | Del Sesto et al. |
| 6,532,589 B1 | 3/2003 | Proehl et al. |
| 6,564,263 B1 | 5/2003 | Bergman et al. |
| 6,567,104 B1 | 5/2003 | Andrew et al. |
| 6,571,392 B1 | 5/2003 | Zigmond et al. |
| 6,591,292 B1 | 7/2003 | Morrison et al. |
| 6,621,509 B1 | 9/2003 | Eiref et al. |
| 6,636,887 B1 | 10/2003 | Augeri |
| 6,658,661 B1 | 12/2003 | Arsenault et al. |
| 6,678,891 B1 | 1/2004 | Wilcox et al. |
| 6,684,400 B1 | 1/2004 | Goode et al. |
| 6,694,312 B2 | 2/2004 | Kobayashi et al. |
| 6,698,020 B1 | 2/2004 | Zigmond et al. |
| 6,704,359 B1 | 3/2004 | Bayrakeri et al. |
| 6,731,310 B2 | 5/2004 | Craycroft et al. |
| 6,745,367 B1 | 6/2004 | Bates et al. |
| 6,760,043 B2 | 7/2004 | Markel |
| 6,763,522 B1 | 7/2004 | Kondo et al. |
| 6,766,526 B1 | 7/2004 | Ellis |
| 6,806,887 B2 | 10/2004 | Chernock et al. |
| 6,857,128 B1 | 2/2005 | Borden, IV et al. |
| 6,886,029 B1 | 4/2005 | Pecus et al. |
| 6,904,610 B1 | 6/2005 | Bayrakeri et al. |
| 6,910,191 B2 | 6/2005 | Segerberg et al. |
| 6,918,131 B1 | 7/2005 | Rautila et al. |
| 6,963,880 B1 | 11/2005 | Pingte et al. |
| 7,028,327 B1 | 4/2006 | Dougherty et al. |
| 7,065,785 B1 | 6/2006 | Shaffer et al. |
| 7,080,400 B1 | 7/2006 | Navar |
| 7,103,904 B1 | 9/2006 | Blackketter et al. |
| 7,114,170 B2 | 9/2006 | Harris et al. |

(56) References Cited

U.S. PATENT DOCUMENTS

| | | |
|---|---|---|
| 7,134,072 B1 | 11/2006 | Lovett et al. |
| 7,152,236 B1 | 12/2006 | Wugofski et al. |
| 7,162,694 B2 | 1/2007 | Venolia |
| 7,162,697 B2 | 1/2007 | Markel |
| 7,174,512 B2 | 2/2007 | Martin et al. |
| 7,177,861 B2 | 2/2007 | Tovinkere et al. |
| 7,197,715 B1 | 3/2007 | Valeria |
| 7,207,057 B1 | 4/2007 | Rowe |
| 7,213,005 B2 | 5/2007 | Mourad et al. |
| 7,221,801 B2 | 5/2007 | Jang et al. |
| 7,237,252 B2 | 6/2007 | Billmaier |
| 7,293,275 B1 | 11/2007 | Krieger et al. |
| 7,305,696 B2 | 12/2007 | Thomas et al. |
| 7,313,806 B1 | 12/2007 | Williams et al. |
| 7,337,457 B2 | 2/2008 | Pack et al. |
| 7,360,232 B2 | 4/2008 | Mitchell |
| 7,363,612 B2 | 4/2008 | Satuloori et al. |
| 7,406,705 B2 | 7/2008 | Crinon et al. |
| 7,440,967 B2 | 10/2008 | Chidlovskii |
| 7,464,344 B1 | 12/2008 | Carmichael et al. |
| 7,472,137 B2 | 12/2008 | Edelstein et al. |
| 7,490,092 B2 | 2/2009 | Sibley et al. |
| 7,516,468 B1 | 4/2009 | Deller et al. |
| 7,523,180 B1 | 4/2009 | DeLuca et al. |
| 7,587,415 B2 | 9/2009 | Gaurav et al. |
| 7,624,416 B1 | 11/2009 | Vandermolen et al. |
| 7,640,487 B2 | 12/2009 | Amielh-Caprioglio et al. |
| 7,702,315 B2 | 4/2010 | Engstrom et al. |
| 7,703,116 B1 | 4/2010 | Moreau et al. |
| 7,721,307 B2 | 5/2010 | Hendricks et al. |
| 7,743,330 B1 | 6/2010 | Hendricks et al. |
| 7,752,258 B2 | 7/2010 | Lewin et al. |
| 7,861,259 B2 | 12/2010 | Barone, Jr. |
| 7,913,286 B2 | 3/2011 | Sarachik et al. |
| 7,958,528 B2 | 6/2011 | Moreau et al. |
| 7,975,277 B1 | 7/2011 | Jerding et al. |
| 8,006,262 B2 | 8/2011 | Rodriguez et al. |
| 8,032,914 B2 | 10/2011 | Rodriguez |
| 8,156,533 B2 | 4/2012 | Crichton |
| 8,220,018 B2 | 7/2012 | de Andrade et al. |
| 8,266,652 B2 | 9/2012 | Roberts et al. |
| 8,296,805 B2 | 10/2012 | Tabatabai et al. |
| 8,365,230 B2 | 1/2013 | Chane et al. |
| 8,381,259 B1 | 2/2013 | Khosla |
| 8,434,109 B2 | 4/2013 | Kamimaeda et al. |
| 8,448,208 B2 | 5/2013 | Moreau et al. |
| 8,660,545 B1 | 2/2014 | Redford et al. |
| 8,699,862 B1 | 4/2014 | Sharifi et al. |
| 8,793,256 B2 | 7/2014 | McIntire et al. |
| 8,850,495 B2 | 9/2014 | Pan |
| 8,863,196 B2 | 10/2014 | Patil et al. |
| 8,938,675 B2 | 1/2015 | Holladay et al. |
| 8,943,533 B2 | 1/2015 | de Andrade et al. |
| 8,973,063 B2 | 3/2015 | Spilo et al. |
| 9,021,528 B2 | 4/2015 | Moreau et al. |
| 9,363,560 B2 | 6/2016 | Moreau et al. |
| 9,473,548 B1 | 10/2016 | Chakrovorthy et al. |
| 9,516,253 B2 | 12/2016 | De Andrade et al. |
| 2001/0014206 A1 | 8/2001 | Artigalas et al. |
| 2001/0027563 A1 | 10/2001 | White et al. |
| 2001/0049823 A1 | 12/2001 | Matey |
| 2001/0056573 A1 | 12/2001 | Kovac et al. |
| 2001/0056577 A1 | 12/2001 | Gordon et al. |
| 2002/0010928 A1 | 1/2002 | Sahota |
| 2002/0016969 A1 | 2/2002 | Kimble |
| 2002/0023270 A1 | 2/2002 | Thomas et al. |
| 2002/0026642 A1 | 2/2002 | Augenbraun et al. |
| 2002/0032905 A1 | 3/2002 | Sherr et al. |
| 2002/0035573 A1 | 3/2002 | Black et al. |
| 2002/0041104 A1 | 4/2002 | Graf et al. |
| 2002/0042915 A1 | 4/2002 | Kubischta et al. |
| 2002/0042920 A1 | 4/2002 | Thomas et al. |
| 2002/0046099 A1 | 4/2002 | Frengut et al. |
| 2002/0059094 A1 | 5/2002 | Hosea et al. |
| 2002/0059586 A1 | 5/2002 | Carney et al. |
| 2002/0059629 A1 | 5/2002 | Markel |
| 2002/0067376 A1 | 6/2002 | Martin et al. |
| 2002/0069407 A1 | 6/2002 | Fagnani et al. |
| 2002/0070978 A1 | 6/2002 | Wishoff et al. |
| 2002/0078444 A1 | 6/2002 | Krewin et al. |
| 2002/0078449 A1 | 6/2002 | Gordon et al. |
| 2002/0083450 A1 | 6/2002 | Kamen et al. |
| 2002/0100041 A1 | 7/2002 | Rosenberg et al. |
| 2002/0104083 A1 | 8/2002 | Hendricks et al. |
| 2002/0107973 A1 | 8/2002 | Lennon et al. |
| 2002/0108121 A1 | 8/2002 | Alao et al. |
| 2002/0108122 A1 | 8/2002 | Alao et al. |
| 2002/0120609 A1 | 8/2002 | Lang et al. |
| 2002/0124254 A1 | 9/2002 | Kikinis |
| 2002/0124256 A1 | 9/2002 | Suzuka |
| 2002/0144268 A1 | 10/2002 | Khoo et al. |
| 2002/0144269 A1 | 10/2002 | Connelly |
| 2002/0144273 A1 | 10/2002 | Reto |
| 2002/0147645 A1 | 10/2002 | Alao et al. |
| 2002/0152477 A1 | 10/2002 | Goodman et al. |
| 2002/0156839 A1 | 10/2002 | Peterson et al. |
| 2002/0156890 A1 | 10/2002 | Carlyle et al. |
| 2002/0162120 A1 | 10/2002 | Mitchell |
| 2002/0169885 A1 | 11/2002 | Alao et al. |
| 2002/0170059 A1 | 11/2002 | Hoang |
| 2002/0171691 A1 | 11/2002 | Currans et al. |
| 2002/0171940 A1 | 11/2002 | He et al. |
| 2002/0184629 A1 | 12/2002 | Sie et al. |
| 2002/0188944 A1 | 12/2002 | Noble |
| 2002/0194181 A1 | 12/2002 | Wachtel |
| 2002/0196268 A1 | 12/2002 | Wolff et al. |
| 2002/0199187 A1 | 12/2002 | Gissin et al. |
| 2002/0199190 A1 | 12/2002 | Su |
| 2003/0001880 A1 | 1/2003 | Holtz et al. |
| 2003/0005444 A1 | 1/2003 | Crinon et al. |
| 2003/0005453 A1 | 1/2003 | Rodriguez et al. |
| 2003/0014752 A1 | 1/2003 | Zaslavsky et al. |
| 2003/0014753 A1 | 1/2003 | Beach et al. |
| 2003/0018755 A1 | 1/2003 | Masterson et al. |
| 2003/0023970 A1 | 1/2003 | Panabaker |
| 2003/0023975 A1* | 1/2003 | Schrader ............ H04N 21/2665 725/51 |
| 2003/0025832 A1 | 2/2003 | Swart et al. |
| 2003/0028871 A1 | 2/2003 | Wang et al. |
| 2003/0028873 A1 | 2/2003 | Lemmons |
| 2003/0041104 A1 | 2/2003 | Wingard et al. |
| 2003/0051246 A1 | 3/2003 | Wilder et al. |
| 2003/0056216 A1 | 3/2003 | Wugofski et al. |
| 2003/0056218 A1 | 3/2003 | Wingard et al. |
| 2003/0058948 A1 | 3/2003 | Kelly et al. |
| 2003/0061028 A1 | 3/2003 | Dey et al. |
| 2003/0066081 A1 | 4/2003 | Barone et al. |
| 2003/0067554 A1 | 4/2003 | Klarfeld et al. |
| 2003/0068046 A1 | 4/2003 | Lindqvist et al. |
| 2003/0070170 A1 | 4/2003 | Lennon |
| 2003/0079226 A1 | 4/2003 | Barrett |
| 2003/0084443 A1 | 5/2003 | Laughlin et al. |
| 2003/0084444 A1 | 5/2003 | Ullman et al. |
| 2003/0084449 A1 | 5/2003 | Chane et al. |
| 2003/0086694 A1 | 5/2003 | Davidsson |
| 2003/0093760 A1* | 5/2003 | Suzuki ................. G06F 40/143 715/239 |
| 2003/0093790 A1 | 5/2003 | Logan et al. |
| 2003/0093792 A1 | 5/2003 | Labeeb et al. |
| 2003/0097657 A1 | 5/2003 | Zhou et al. |
| 2003/0110500 A1 | 6/2003 | Rodriguez |
| 2003/0110503 A1 | 6/2003 | Perkes |
| 2003/0115219 A1 | 6/2003 | Chadwick |
| 2003/0115612 A1 | 6/2003 | Mao et al. |
| 2003/0126601 A1 | 7/2003 | Roberts et al. |
| 2003/0132971 A1 | 7/2003 | Billmaier et al. |
| 2003/0135464 A1 | 7/2003 | Mourad et al. |
| 2003/0135582 A1 | 7/2003 | Allen et al. |
| 2003/0140097 A1 | 7/2003 | Schloer |
| 2003/0151621 A1 | 8/2003 | McEvilly et al. |
| 2003/0158777 A1 | 8/2003 | Schiff et al. |
| 2003/0172370 A1 | 9/2003 | Satuloori et al. |
| 2003/0177501 A1 | 9/2003 | Takahashi et al. |
| 2003/0182663 A1 | 9/2003 | Gudorf et al. |

(56) References Cited

U.S. PATENT DOCUMENTS

| | | |
|---|---|---|
| 2003/0189668 A1 | 10/2003 | Newnam et al. |
| 2003/0204814 A1 | 10/2003 | Elo et al. |
| 2003/0204846 A1 | 10/2003 | Breen et al. |
| 2003/0204854 A1 | 10/2003 | Blackketter et al. |
| 2003/0207696 A1 | 11/2003 | Willenegger et al. |
| 2003/0226141 A1 | 12/2003 | Krasnow et al. |
| 2003/0229899 A1 | 12/2003 | Thompson et al. |
| 2004/0003402 A1 | 1/2004 | McKenna |
| 2004/0003404 A1 | 1/2004 | Boston et al. |
| 2004/0019900 A1 | 1/2004 | Knightbridge et al. |
| 2004/0019908 A1 | 1/2004 | Williams et al. |
| 2004/0022271 A1 | 2/2004 | Fichet et al. |
| 2004/0024753 A1 | 2/2004 | Chane et al. |
| 2004/0025180 A1 | 2/2004 | Begeja et al. |
| 2004/0031015 A1 | 2/2004 | Ben-Romdhane et al. |
| 2004/0031058 A1 | 2/2004 | Reisman |
| 2004/0031062 A1 | 2/2004 | Lemmons |
| 2004/0039754 A1 | 2/2004 | Harple |
| 2004/0073915 A1 | 4/2004 | Dureau |
| 2004/0078814 A1 | 4/2004 | Allen |
| 2004/0107437 A1 | 6/2004 | Reichardt et al. |
| 2004/0107439 A1 | 6/2004 | Hassell et al. |
| 2004/0111465 A1 | 6/2004 | Chuang et al. |
| 2004/0128699 A1 | 7/2004 | Delpuch et al. |
| 2004/0133923 A1 | 7/2004 | Watson et al. |
| 2004/0136698 A1 | 7/2004 | Mock |
| 2004/0168186 A1 | 8/2004 | Rector et al. |
| 2004/0172648 A1 | 9/2004 | Xu et al. |
| 2004/0189658 A1 | 9/2004 | Dowdy |
| 2004/0194136 A1 | 9/2004 | Finseth et al. |
| 2004/0199578 A1 | 10/2004 | Kapczynski et al. |
| 2004/0221306 A1 | 11/2004 | Noh |
| 2004/0224723 A1 | 11/2004 | Farcasiu |
| 2004/0225751 A1 | 11/2004 | Urali |
| 2004/0226051 A1 | 11/2004 | Carney et al. |
| 2005/0005288 A1 | 1/2005 | Novak |
| 2005/0015796 A1 | 1/2005 | Bruckner et al. |
| 2005/0015804 A1 | 1/2005 | LaJoie et al. |
| 2005/0028208 A1 | 2/2005 | Ellis et al. |
| 2005/0086172 A1 | 4/2005 | Stefik |
| 2005/0125835 A1 | 6/2005 | Wei |
| 2005/0149972 A1 | 7/2005 | Knudson |
| 2005/0155063 A1 | 7/2005 | Bayrakeri et al. |
| 2005/0160458 A1 | 7/2005 | Baumgartner |
| 2005/0166230 A1 | 7/2005 | Gaydou et al. |
| 2005/0204385 A1 | 9/2005 | Sull et al. |
| 2005/0259147 A1 | 11/2005 | Nam et al. |
| 2005/0262542 A1 | 11/2005 | DeWeese et al. |
| 2005/0283800 A1 | 12/2005 | Ellis et al. |
| 2005/0287948 A1 | 12/2005 | Hellwagner et al. |
| 2006/0004743 A1 | 1/2006 | Murao et al. |
| 2006/0059525 A1 | 3/2006 | Jerding et al. |
| 2006/0068818 A1 | 3/2006 | Leitersdorf et al. |
| 2006/0080707 A1 | 4/2006 | Laksono |
| 2006/0080716 A1 | 4/2006 | Nishikawa et al. |
| 2006/0104511 A1 | 5/2006 | Guo et al. |
| 2006/0105793 A1 | 5/2006 | Gutowski et al. |
| 2006/0125962 A1 | 6/2006 | Shelton et al. |
| 2006/0143191 A1* | 6/2006 | Cho .................. G11B 27/034 |
| 2006/0156336 A1 | 7/2006 | Knudson et al. |
| 2006/0195865 A1 | 8/2006 | Fablet |
| 2006/0200842 A1 | 9/2006 | Chapman et al. |
| 2006/0206470 A1 | 9/2006 | McIntyre |
| 2006/0206912 A1 | 9/2006 | Klarfeld et al. |
| 2006/0233514 A1 | 10/2006 | Weng et al. |
| 2006/0248572 A1 | 11/2006 | Kitsukama et al. |
| 2007/0019001 A1 | 1/2007 | Ha |
| 2007/0050343 A1 | 3/2007 | Siddarampappa et al. |
| 2007/0064715 A1 | 3/2007 | Lloyd et al. |
| 2007/0083538 A1 | 4/2007 | Roy et al. |
| 2007/0112761 A1 | 5/2007 | Xu et al. |
| 2007/0157247 A1 | 7/2007 | Cordray et al. |
| 2007/0211762 A1 | 9/2007 | Song et al. |
| 2007/0214123 A1 | 9/2007 | Messer et al. |
| 2007/0214488 A1 | 9/2007 | Nguyen et al. |
| 2007/0220016 A1 | 9/2007 | Estrada et al. |
| 2007/0239707 A1 | 10/2007 | Collins et al. |
| 2007/0250901 A1 | 10/2007 | McIntire et al. |
| 2007/0260700 A1 | 11/2007 | Messer |
| 2007/0261072 A1 | 11/2007 | Boulet et al. |
| 2007/0271587 A1 | 11/2007 | Rowe |
| 2008/0037722 A1 | 2/2008 | Klassen |
| 2008/0060011 A1 | 3/2008 | Kelts |
| 2008/0071770 A1 | 3/2008 | Schloter et al. |
| 2008/0092201 A1 | 4/2008 | Agarwal et al. |
| 2008/0113504 A1 | 5/2008 | Lee et al. |
| 2008/0126109 A1 | 5/2008 | Cragun et al. |
| 2008/0133504 A1 | 6/2008 | Messer et al. |
| 2008/0148317 A1 | 6/2008 | Opaluch |
| 2008/0163304 A1 | 7/2008 | Ellis |
| 2008/0183681 A1 | 7/2008 | Messer et al. |
| 2008/0183698 A1 | 7/2008 | Messer et al. |
| 2008/0189740 A1 | 8/2008 | Carpenter et al. |
| 2008/0196070 A1 | 8/2008 | White et al. |
| 2008/0204595 A1 | 8/2008 | Rathod et al. |
| 2008/0208796 A1 | 8/2008 | Messer et al. |
| 2008/0208839 A1 | 8/2008 | Sheshagiri et al. |
| 2008/0221989 A1 | 9/2008 | Messer et al. |
| 2008/0235209 A1 | 9/2008 | Rathod et al. |
| 2008/0235393 A1 | 9/2008 | Kunjithapatham et al. |
| 2008/0235725 A1 | 9/2008 | Hendricks |
| 2008/0250010 A1 | 10/2008 | Rathod et al. |
| 2008/0256097 A1 | 10/2008 | Messer et al. |
| 2008/0266449 A1 | 10/2008 | Rathod et al. |
| 2008/0276278 A1 | 11/2008 | Krieger et al. |
| 2008/0282294 A1 | 11/2008 | Carpenter et al. |
| 2008/0288641 A1 | 11/2008 | Messer et al. |
| 2008/0288644 A1 | 11/2008 | Gilfix et al. |
| 2008/0301320 A1 | 12/2008 | Morris |
| 2008/0301732 A1 | 12/2008 | Archer et al. |
| 2008/0317233 A1 | 12/2008 | Rey et al. |
| 2009/0006315 A1 | 1/2009 | Mukherjea et al. |
| 2009/0019485 A1 | 1/2009 | Ellis et al. |
| 2009/0024629 A1 | 1/2009 | Miyauchi |
| 2009/0025054 A1 | 1/2009 | Gibbs et al. |
| 2009/0083257 A1 | 3/2009 | Bargeron et al. |
| 2009/0094113 A1 | 4/2009 | Berry et al. |
| 2009/0094632 A1 | 4/2009 | Newnam et al. |
| 2009/0094651 A1 | 4/2009 | Damm et al. |
| 2009/0123021 A1 | 5/2009 | Jung et al. |
| 2009/0133025 A1 | 5/2009 | Malhotra et al. |
| 2009/0164904 A1 | 6/2009 | Horowitz et al. |
| 2009/0183210 A1 | 7/2009 | Andrade |
| 2009/0222872 A1 | 9/2009 | Schlack |
| 2009/0228441 A1 | 9/2009 | Sandvik |
| 2009/0240650 A1 | 9/2009 | Wang et al. |
| 2009/0249427 A1 | 10/2009 | Dunnigan et al. |
| 2009/0271829 A1 | 10/2009 | Larsson et al. |
| 2009/0288132 A1 | 11/2009 | Hegde |
| 2009/0292548 A1 | 11/2009 | Van Court |
| 2010/0023966 A1 | 1/2010 | Shahraray et al. |
| 2010/0077057 A1 | 3/2010 | Godin et al. |
| 2010/0079670 A1 | 4/2010 | Frazier et al. |
| 2010/0175084 A1 | 7/2010 | Ellis et al. |
| 2010/0180300 A1 | 7/2010 | Carpenter et al. |
| 2010/0223640 A1 | 9/2010 | Reichardt et al. |
| 2010/0250190 A1 | 9/2010 | Zhang et al. |
| 2010/0251284 A1 | 9/2010 | Ellis et al. |
| 2010/0257548 A1 | 10/2010 | Lee et al. |
| 2011/0055282 A1 | 3/2011 | Hoving |
| 2011/0058101 A1 | 3/2011 | Earley et al. |
| 2011/0087348 A1 | 4/2011 | Wong |
| 2011/0093909 A1 | 4/2011 | Roberts et al. |
| 2011/0131204 A1 | 6/2011 | Bodin et al. |
| 2011/0176787 A1 | 7/2011 | DeCamp |
| 2011/0209180 A1 | 8/2011 | Ellis et al. |
| 2011/0211813 A1 | 9/2011 | Marks |
| 2011/0214143 A1 | 9/2011 | Rits et al. |
| 2011/0219386 A1 | 9/2011 | Hwang et al. |
| 2011/0219419 A1 | 9/2011 | Reisman |
| 2011/0225417 A1 | 9/2011 | Maharajh et al. |
| 2011/0246495 A1 | 10/2011 | Mallinson |
| 2011/0247042 A1 | 10/2011 | Mallinson |
| 2011/0289098 A1 | 11/2011 | Oztaskent et al. |

(56) References Cited

U.S. PATENT DOCUMENTS

| | | | |
|---|---|---|---|
| 2012/0002111 A1 | 1/2012 | Sandoval et al. |
| 2012/0011550 A1 | 1/2012 | Holland |
| 2012/0054811 A1 | 3/2012 | Spears |
| 2012/0066602 A1 | 3/2012 | Chai et al. |
| 2012/0117151 A1 | 5/2012 | Bill |
| 2012/0185905 A1 | 7/2012 | Kelley |
| 2012/0192226 A1 | 7/2012 | Zimmerman et al. |
| 2012/0227073 A1 | 9/2012 | Hosein et al. |
| 2012/0233646 A1 | 9/2012 | Coniglio et al. |
| 2012/0295686 A1 | 11/2012 | Lockton |
| 2012/0324002 A1 | 12/2012 | Chen |
| 2012/0324494 A1 | 12/2012 | Burger et al. |
| 2012/0324495 A1 | 12/2012 | Matthews, III et al. |
| 2012/0324518 A1 | 12/2012 | Thomas et al. |
| 2013/0007043 A1 | 1/2013 | Phillips |
| 2013/0014155 A1 | 1/2013 | Clarke et al. |
| 2013/0040623 A1 | 2/2013 | Chun et al. |
| 2013/0051770 A1 | 2/2013 | Sargent |
| 2013/0103446 A1 | 4/2013 | Bragdon et al. |
| 2013/0110769 A1 | 5/2013 | Ito |
| 2013/0111514 A1 | 5/2013 | Slavin et al. |
| 2013/0170813 A1 | 7/2013 | Woods et al. |
| 2013/0176493 A1 | 7/2013 | Khosla |
| 2013/0198642 A1 | 8/2013 | Carney et al. |
| 2013/0262997 A1 | 10/2013 | Markworth et al. |
| 2013/0298038 A1 | 11/2013 | Spivack et al. |
| 2013/0316716 A1 | 11/2013 | Tapia et al. |
| 2013/0326570 A1 | 12/2013 | Cowper et al. |
| 2013/0332839 A1 | 12/2013 | Frazier et al. |
| 2013/0332852 A1 | 12/2013 | Castanho et al. |
| 2013/0332855 A1 | 12/2013 | Roman et al. |
| 2013/0347018 A1 | 12/2013 | Limp et al. |
| 2013/0347030 A1 | 12/2013 | Oh et al. |
| 2014/0006951 A1 | 1/2014 | Hunter |
| 2014/0009680 A1 | 1/2014 | Moon et al. |
| 2014/0026068 A1 | 1/2014 | Park et al. |
| 2014/0032473 A1 | 1/2014 | Enoki et al. |
| 2014/0053078 A1 | 2/2014 | Kannan |
| 2014/0068648 A1 | 3/2014 | Green et al. |
| 2014/0075465 A1 | 3/2014 | Petrovic et al. |
| 2014/0089423 A1 | 3/2014 | Jackels |
| 2014/0089967 A1 | 3/2014 | Mandalia et al. |
| 2014/0129570 A1 | 5/2014 | Johnson |
| 2014/0149918 A1 | 5/2014 | Asokan et al. |
| 2014/0150022 A1 | 5/2014 | Oh et al. |
| 2014/0237498 A1 | 8/2014 | Ivins |
| 2014/0267931 A1 | 9/2014 | Gilson et al. |
| 2014/0279852 A1 | 9/2014 | Chen |
| 2014/0280695 A1 | 9/2014 | Sharma et al. |
| 2014/0282122 A1 | 9/2014 | Mathur |
| 2014/0325359 A1 | 10/2014 | Vehovsky et al. |
| 2014/0327677 A1 | 11/2014 | Walker |
| 2014/0334381 A1 | 11/2014 | Subramaniam et al. |
| 2014/0359662 A1 | 12/2014 | Packard et al. |
| 2014/0365302 A1 | 12/2014 | Walker |
| 2014/0373032 A1 | 12/2014 | Merry et al. |
| 2015/0020096 A1 | 1/2015 | Walker |
| 2015/0026743 A1 | 1/2015 | Kim et al. |
| 2015/0263923 A1 | 9/2015 | Kruglick |

FOREIGN PATENT DOCUMENTS

| | | | |
|---|---|---|---|
| EP | 1058999 A1 | 12/2000 |
| EP | 1080582 A1 | 3/2001 |
| GB | 2323489 A | 9/1998 |
| GB | 2448874 A | 11/2008 |
| GB | 2448875 A | 11/2008 |
| WO | 9963757 A1 | 12/1999 |
| WO | 2000011869 A1 | 3/2000 |
| WO | 0033576 A1 | 6/2000 |
| WO | 0110115 A1 | 2/2001 |
| WO | 0182613 A1 | 11/2001 |
| WO | 2001084830 A1 | 11/2001 |
| WO | 02063426 A2 | 8/2002 |
| WO | 02063471 A2 | 8/2002 |
| WO | 02063851 A2 | 8/2002 |
| WO | 02063878 A2 | 8/2002 |
| WO | 03009126 A1 | 1/2003 |
| WO | 2003/026275 A2 | 3/2003 |
| WO | 2007115224 A2 | 10/2007 |
| WO | 2008053132 A1 | 5/2008 |
| WO | 2011/053271 A1 | 5/2011 |
| WO | 2012/094105 A1 | 7/2012 |
| WO | 2012/154541 A1 | 11/2012 |

OTHER PUBLICATIONS

Michael Adams, "Open Cable Architecture", Cisco Press, Dec. 3, 1999.

Andreas Kraft and Klaus Hofrichter, "An Approach for Script-Based Broadcast Application Production", Springer-Verlag Berlin Heidelberg, pp. 74-82, 1999.

Mark Riehl, "XML and Perl", Sams, Oct. 16, 2002.

MetaTV, Inc., PCT/US02/29917 filed Sep. 19, 2002, International Search Report dated Apr. 14, 2003; ISA/US; 6 pages.

Sylvain Devillers, "Bitstream Syntax Definition Language: an Input to MPEG-21 Content Representation", Mar. 2001, ISO, ISO/IEC JTC1/SC29/WG11 MPEG01/M7053.

Shim, et al., "A SMIL Based Graphical Interface for Interactive TV", Internet Tech. Laboratory Dept. of Comp. Engineering, San Jose State University, pp. 257-266, 2003.

Yoon, et al., "Video Gadget: MPET-7 Based Audio-Visual Content Indexing and Browsing Engine", LG Electronics Institute of Technology, 2001, pp. 59-68.

Watchwith webpage; http://www.watchwith.com/content_owners/watchwith_plalform_components.jsp (last visited Mar. 12, 2013).

Matt Duffy; TVplus App reveals content click-through rates north of 10% across sync enabled programming; http://www.tvplus.com/blog/TVplus-App-reveals-content-click-through-rates-north-of-10-Percent-across-sync-enabled-programming (retrieved from the Wayback Machine on Mar. 12, 2013).

"In Time for Academy Awards Telecast, Companion TV App Umami Debuts First Real-Time Sharing of a TV Program's Images"; Umami News; http:www.umami.tv/2012-02-23.html (retrieved from the Wayback Machine on Mar. 12, 2013).

European Patent Application No. 09175979.5—Office Action dated Dec. 13, 2011.

Canadian Patent Application No. 2,685,833—Office Action dated Jan. 20, 2012.

Li, Y. et al. "Reliable Video Clock Time Recognition", Pattern Recognition, 2006, 1CPR 1006, 18th International Conference on Pattern Recognition, 4 pages.

European Search Report dated Mar. 1, 2010.

Salton et al., Computer Evaluation of Indexing and Text Processing Journal of the Association for Computing Machinery, vol. 15, No. 1, Jan. 1968, pp. 8-36.

Smith, J.R. et al., An Image and Video Search Engine for the World-Wide Web Storage and Retrieval for Image and Video Databases 5, San Jose, Feb. 13-14, 1997, Proceedings of Spie, Bellingham, Spie, US, vol. 3022, Feb. 13, 1997, pp. 84-95.

Kontothoanassis, Ledonias et al. "Design, Implementation, and Analysis of a Multimedia Indexing and Delivery Server", Technical Report Series, Aug. 1999, Cambridge Research Laboratory.

Messer, Alan et al., "SeeNSearch: a context Directed Search Facilitator for Home Entertainment Devices", Paper, Samsung Information Systems America Inc., San Jose, CA, 2008.

Boulgouris N. V. et al., "Real-Time Compressed-Domain Spatiotemporal Segmentation and Ontologies for Video Indexing and Retrieval", IEEE Transactions on Circuits and Systems for Video Technology, vol. 14, No. 5, pp. 606-621, May 2004.

Changsheng Xu et al., "Using Webcast Text for Semantic Event Detection in Broadcast Sports Video", IEEE Transactions on Multimedia, vol. 10, No. 7, pp. 1342-1355, Nov. 2008.

Liang Bai et al., "Video Semantic Content Analysis based on Ontology", International Machine Vision and Image Processing Conference, pp. 117-124, Sep. 2007.

(56) References Cited

OTHER PUBLICATIONS

Koskela M. et al., "Measuring Concept Similarities in Multimedia Ontologies: Analysis and Evaluations", IEEE Transactions on Multimedia, vol. 9, No. 5, pp. 912-922, Aug. 2007.
Steffan Staab et al., "Semantic Multimedia", Reasoning Web; Lecture Notes in Computer Science, pp. 125-170, Sep. 2008.
European Search Report for Application No. 09180776.8, dated Jun. 7, 2010, 9 pages.
European Search Report, EP 09 18 0762, completion date Mar. 22, 2010.
European Search Report dated Jun. 4, 2010.
EP Application No. 09 179 987.4-1241—Office Action dated Feb. 15, 2011.
European Application No. 09 175 979.5—Office Action dated Apr. 11, 2011.
Boronat F et al: "Multimedia group and inter-stream synchronization techniques: a comparative study", Information Systems. Pergamon Press. Oxford. GB. vol. 34. No. 1. Mar. 1, 2009 (Mar. 1, 2009). pp. 108-131. XP025644936.
Extended European Search Report—EP14159227.9—dated Sep. 3, 2014.
Canadian Office Action—CA 2,685,833—dated Jan. 22, 2015.
European Extended Search Report—EP 13192112.4—dated May 11, 2015.
CA Response to Office Action—CA Appl. 2,685,833—dated Jul. 17, 2015.
Response to European Office Action—European Appl. 13192112.4—dated Dec. 9, 2015.
CA Office Action—CA App 2,685,833—dated Jan. 27, 2016.
European Office Action—EP App 14159227.9—dated Jul. 12, 2016.
Agnieszka Zagozdzinnska et al. "TRIDAQ Systems in HEP Experiments at LHC Accelerator" Kwartalnik Elektroniki I Telekomunikacji, vol. 59, No. 4, Oct. 2013.
CA Office Action—CA Application 2685833—dated Feb. 8, 2017.
Nov. 29, 2017—Canadian Office Action—CA 2,685,833.
Feb. 19, 2018—European Summons to Oral Proceedings—EP 14159227.9.
Mar. 9, 2018—European Office Action—EP 13192112.4.
Jul. 31, 2018—European Decision to Refuse—14159227.9.
Sep. 5, 2019—Canadian Office Action—CA 2,685,833.
Nov. 6, 2019—Canadian Office Action—CA 2,832,800.
Apr. 21, 2020—European Summons to Oral Proceedings—EP 09175979.5.
Aug. 24, 2020, Canadian Office Action, CA 2,832,800.
U.S. Pat. No. 7,703,116, System and Method for Construction, Delivery and Display of iTV Applications That Blend Programming Information of On-Demand and Broadcast Service Offerings, Apr. 20, 2010.
U.S. Pat. No. 7,805,746, Optimized Application On-The-Wire Format for Construction, Delivery and Display of Enhanced Television, Sep. 28, 2010.
U.S. Pat. No. 7,818,667, Verification of Semantic Constraints in Multimedia Data and in its Announcement, Signaling and Interchange, Oct. 19, 2010.
U.S. Pat. No. 7,958,528, System and Method for Construction, Delivery and Display of iTV Applications That Blend Programming Information of On-Demand and Broadcast Service Offerings, Jun. 7, 2011.
U.S. Pat. No. 8,042,132, System and Method for Construction, Delivery and Display of iTV Content, Oct. 18, 2011.
U.S. Pat. No. 8,220,018, System and Method for Preferred Placement Programing of iTV Content, Jul. 10, 2012.
U.S. Pat. No. 8,352,983, Programming Contextual Interactive User Interface for Television, Jan. 8, 2013.
U.S. Pat. No. 8,365,230, Interactive User Interface for Television Applications, Jan. 29, 2013.
U.S. Pat. No. 8,413,205, System and Method for Construction, Delivery and Display of iTV Content, Apr. 2, 2013.
U.S. Pat. No. 8,416,952, Channel Family Surf Control, Apr. 9, 2013.
U.S. Pat. No. 8,448,208, System an Method for Construction, Delivery, and Display of ITV Applications that Blend, May 21, 2013.
U.S. Pat. No. 8,578,411, System and Method for Controlling iTV Application Behaviors Through the Use of Application Profile Filters, Nov. 5, 2013.
U.S. Pat. No. 8,707,354, Graphically Rich, Modular, Promotional Tile Interface for Interactive Television, Apr. 22, 2014.
U.S. Pat. No. 8,745,658, System and Method for Construction, Delivery and Display of iTV Content, Jun. 3, 2014.
U.S. Pat. No. 8,756,634, Programming Contextual Interactive User Interface for Television, Jun. 17, 2014.
U.S. Pat. No. 8,819,734, Contextual Navigational Control for Digital Television, Aug. 26, 2014.
U.S. Pat. No. 8,850,480, Interactive User Interface for Television Applications, Sep. 30, 2014.
U.S. Pat. No. 8,943,533, System and Method for Preferred Placement Programing of iTV Content, Jan. 27, 2015.
U.S. Pat. No. 9,021,528, System and Method for Construction, Delivery and Display of iTV Applications That Blend, Apr. 28, 2015.
U.S. Pat. No. 9,197,938, Programming Contextual Interactive User Interface for Television, Nov. 24, 2015.
U.S. Pat. No. 9,363,560, System and Method for Construction, Delivery and Display of iTV Applications That Blend Programming Information of On-Demand and Broadcast Service Offerings., Jun. 7, 2016.
U.S. Pat. No. 9,414,022, Verification of Semantic Constraints in Multimedia Data and in its Announcement, Signaling and Interchange, Aug. 9, 2016.
U.S. Pat. No. 9,451,196, System and Method for Construction, Delivery and Display of iTV Content, Sep. 20, 2016.
U.S. Pat. No. 9,516,253, System and Method for Preferred Placement Programming of iTV Content, Dec. 6, 2016.
U.S. Pat. No. 9,553,927, Synchronizing Multiple Transmissions of Content, Jan. 24, 2017.
U.S. Pat. No. 9,729,924, System and Method for Construction, Delivery and Display of iTV Applications That Blend Programming Information of On-Demand and Broadcast Service Offerings, Aug. 8, 2017.
U.S. Pat. No. 9,967,611, Prioritized Placement of Content Elements for iTV Applications, May 8, 2018.
U.S. Pat. No. 9,992,546, Contextual Navigational Control for Digital Television, Jun. 5, 2018.
U.S. Pat. No. 10,110,973, Verification of Semantic Constraints in Multimedia Data and in its Announcement, Signaling and Interchange, Oct. 23, 2018.
U.S. Pat. No. 10,149,014, Interactive User Interface for Television Applications, Dec. 4, 2018.
U.S. Pat. No. 10,171,878, System and Method for Controlling iTV Application Behaviors through the Use of Application Profile Filters, Jan. 1, 2019.
U.S. Pat. No. 10,237,617, System and Method for Construction, Delivery and Display of iTV Applications that Blend Programming Information of On-Demand and Broadcast Service Offerings, Mar. 19, 2019.
U.S. Pat. No. 10,491,942, Prioritized Placement of Content Elements for iTV Applications, Nov. 26, 2019.
U.S. Pat. No. 10,575,070, Validation of Content, Feb. 25, 2020.
U.S. Pat. No. 10,587,930, Interactive User Interface for Television Applications, Mar. 10, 2020.
U.S. Pat. No. 10,602,225, System and Method for Construction, Delivery and Display of iTV Content, Mar. 24, 2020.
U.S. Pat. No. 10,616,644, System and Method for Blending Linear Content, Non-Linear Content, or Managed Content, Apr. 7, 2020.
U.S. Pat. No. 10,664,138, Providing Supplemental Content, May 26, 2020.
U.S. Pat. No. 10,687,114, System and Method for Controlling iTV Application Behaviors Through the Use of Application Profile Filters, Jun. 16, 2020.
U.S. Pat. No. 10,848,830, Contextual Navigational Control for Digital Television, Nov. 24, 2020.
U.S. Pat. No. 10,880,609, Content Event Messaging, Dec. 29, 2020.

(56) References Cited

OTHER PUBLICATIONS

U.S. Pat. No. 11,070,890, User Customization of User Interfaces for Interactive Television, Jul. 20, 2021.
U.S. Pat. No. 11,089,364, System and Method for Blending Linear Content, Non-Linear Content, or Managed Content, Aug. 10, 2021.
U.S. Pat. No. 11,115,722, Crowdsourcing Supplemental Content, Sep. 7, 2021.
U.S. Appl. No. 10/306,752, Broadcast Database, filed Nov. 27, 2002.
U.S. Appl. No. 12/274,452, Method and Apparatus for Delivering Video and Video Related Content as Sub-Asset Level, filed Nov. 20, 2008.
U.S. Appl. No. 14/520,819, Systems and Methods for Curating Content Metadata, filed Oct. 22, 2014.
U.S. Appl. No. 14/842,196, System and Method for Construction, Delivery and Display of iTV Content, filed Sep. 1, 2015.
U.S. Appl. No. 16/740,921, Validation of Content, filed Jan. 13, 2020.
U.S. Appl. No. 16/851,814, Providing Supplemental Content for a Second Screen Experience, filed Apr. 17, 2020.
U.S. Appl. No. 17/076,446, Contextual Navigational Control for Digital Television, filed Oct. 21, 2020.
U.S. Appl. No. 17/100,341, Content Event Messaging, filed Nov. 20, 2020.
U.S. Appl. No. 17/345,381, User Customization of User Interfaces for Interactive Television, filed Jun. 11, 2021.
U.S. Appl. No. 17/357,001, Causing Display of User-Selectable Content Types, filed Jun. 24, 2021.
U.S. Appl. No. 17/461,564, Crowdsourcing Supplemental Content, filed Aug. 30, 2021.

\* cited by examiner

```xml
<xs:schema xml:lang="en" targetNamespace="http://www.xfsi.com/2005/ebifx-i01"
 xmlns:xs="http://www.w3.org/2001/XMLSchema" xmlns="http://www.xfsi.com/2005/ebifx-i01">
  <!-- Inclusions -->
  <xs:include schemaLocation="primitives.xsd"/>
  <!-- Section 10 - General -->
  <xs:group name="Widget.class">
    <xs:choice>
      <xs:element name="Button" type="Button.type"/>
      <xs:element name="Collection" type="Collection.type"/>
      <xs:element name="Container" type="Container.type"/>
      <xs:element name="Page" type="Page.type"/>
      <xs:element name="Rectangle" type="Rectangle.type"/>
      <xs:element name="ScaledVideo" type="ScaledVideo.type"/>
      <xs:element name="Text" type="Text.type"/>
      <xs:element name="Timer" type="Timer.type"/>
    </xs:choice>
  </xs:group>
  <xs:complexType name="Widget.base">
        <xs:sequence>
          <xs:element name="wType" type="uint8"/>
          <xs:element name="wStyle" type="StyleOffset.type"/>
        </xs:sequence>
    <xs:attribute name="id" type="xs:ID" use="required"/>
  </xs:complexType>
  <!-- Section 10.2 - Button -->
  <xs:complexType name="Button.type">
    <xs:complexContent>
      <xs:extension base="Widget.base">
        <xs:sequence>
          <xs:element name="bwX" type="int16"/>
          <xs:element name="bwY" type="int16"/>
          <xs:element name="bwWidth" type="int16"/>
          <xs:element name="bwHeight" type="int16"/>
          <xs:element name="bwText" type="OptRefIndex.type"/>
          <xs:element name="bwTextXOffset" type="int8"/>
          <xs:element name="bwTextYOffset" type="int8"/>
          <xs:element name="bwHidden" type="bool8"/>
          <xs:element name="bwDisabled" type="bool8"/>
          <xs:element name="bwOnClick" type="ActionIndex.type"/>
          <xs:element name="bwOnFocus" type="ActionIndex.type"/>
          <xs:element name="bwOnBlur" type="ActionIndex.type"/>
          <xs:element name="bwOnMouse" type="ActionIndex.type"/>
        </xs:sequence>
      </xs:extension>
    </xs:complexContent>
  </xs:complexType>
  <!-- Section 10.3 - Collection -->
  <xs:complexType name="Collection.type">
    <xs:complexContent>
      <xs:extension base="Widget.base">
        <xs:sequence>
          <xs:element name="cwTableIndex" type="OptWidgetTableIndex.type"/>
        </xs:sequence>
      </xs:extension>
    </xs:complexContent>
  </xs:complexType>
```

Fig. 2A

```xml
<!-- Section 10.4 - Container -->
<xs:complexType name="Container.type">
  <xs:complexContent>
    <xs:extension base="Widget.base">
      <xs:sequence>
        <xs:element name="cwX" type="int16"/>
        <xs:element name="cwY" type="int16"/>
        <xs:element name="cwFocus" type="int16"/>
        <xs:element name="cwSelectedButton" type="int16"/>
        <xs:element name="cwHidden" type="bool8"/>
        <xs:element name="cwNavmap" type="OptNavMapOffset.type"/>
        <xs:element name="cwTableIndex" type="OptWidgetTableIndex.type"/>
      </xs:sequence>
    </xs:extension>
  </xs:complexContent>
</xs:complexType>
<!-- Section 10.10 - Page -->
<xs:complexType name="Page.type">
  <xs:complexContent>
    <xs:extension base="Widget.base">
      <xs:sequence>
        <xs:element name="pwFocus" type="OptRefIndex.type"/>
        <xs:element name="pwBackgroundRef" type="OptRefIndex.type"/>
        <xs:element name="pwSelectedButton" type="OptRefIndex.type"/>
        <xs:element name="pwBackgroundMode" type="uint8"/>
        <xs:element name="pwUniquePageID" type="int32"/>
        <xs:element name="pwTimeout" type="int32"/>
        <xs:element name="pwRequireFreshData" type="bool8"/>
        <xs:element name="pwOnData" type="ActionIndex.type"/>
        <xs:element name="pwOnLoad" type="ActionIndex.type"/>
        <xs:element name="pwOnUnload" type="ActionIndex.type"/>
        <xs:element name="pwOnPrerender" type="ActionIndex.type"/>
        <xs:element name="pwOnTimeout" type="ActionIndex.type"/>
        <xs:element name="pwOnServiceSelection" type="ActionIndex.type"/>
        <xs:element name="pwEvents" type="OptEventsOffset.type"/>
        <xs:element name="pwNavmap" type="OptNavMapOffset.type"/>
        <xs:element name="pwDataFileSrcName" type="uint16"/>
        <xs:element name="pwTriggerHandlers" type="uint16"/>
        <xs:element name="pwTableIndex" type="OptWidgetTableIndex.type"/>
      </xs:sequence>
    </xs:extension>
  </xs:complexContent>
</xs:complexType>
<!-- Section 10.13 - Rectangle -->
<xs:complexType name="Rectangle.type">
  <xs:complexContent>
    <xs:extension base="Widget.base">
      <xs:sequence>
        <xs:element name="rwX" type="int16"/>
        <xs:element name="rwY" type="int16"/>
        <xs:element name="rwWidth" type="int16"/>
        <xs:element name="rwHeight" type="int16"/>
        <xs:element name="rwHidden" type="bool8"/>
        <xs:element name="rwXRadius" type="uint8"/>
        <xs:element name="rwYRadius" type="uint8"/>
      </xs:sequence>
    </xs:extension>
  </xs:complexContent>
</xs:complexType>
```

Fig. 2B

```xml
<!-- Section 10.15 - ScaledVideo -->
<xs:complexType name="ScaledVideo.type">
    <xs:complexContent>
        <xs:extension base="Widget.base">
            <xs:sequence>
                <xs:element name="svwX" type="int16"/>
                <xs:element name="svwY" type="int16"/>
                <xs:element name="svwWidth" type="int16"/>
                <xs:element name="svwHeight" type="int16"/>
                <xs:element name="svwHidden" type="bool8"/>
                <xs:element name="svwSrc" type="OptRefIndex.type"/>
            </xs:sequence>
        </xs:extension>
    </xs:complexContent>
</xs:complexType>
<!-- Section 10.17 - Text -->
<xs:complexType name="Text.type">
    <xs:complexContent>
        <xs:extension base="Widget.base">
            <xs:sequence>
                <xs:element name="txwX" type="int16"/>
                <xs:element name="txwY" type="int16"/>
                <xs:element name="txwWidth" type="int16"/>
                <xs:element name="txwHeight" type="int16"/>
                <xs:element name="txwText" type="OptRefIndex.type"/>
                <xs:element name="txwTextXOffset" type="int8"/>
                <xs:element name="txwTextYOffset" type="int8"/>
                <xs:element name="txwHidden" type="bool8"/>
                <xs:element name="txwEllipsis" type="bool8"/>
            </xs:sequence>
        </xs:extension>
    </xs:complexContent>
</xs:complexType>
<!-- Section 10.19 - Timer -->
<xs:complexType name="Timer.type">
    <xs:complexContent>
        <xs:extension base="Widget.base">
            <xs:sequence>
                <xs:element name="twPeriod" type="int32"/>
                <xs:element name="twLoop" type="int16"/>
                <xs:element name="twOnTimer" type="ActionIndex.type"/>
                <xs:element name="twRepetitionsRemaining" type="int16"/>
                <xs:element name="twFiretime" type="int32"/>
                <xs:element name="twEnabled" type="bool8"/>
            </xs:sequence>
        </xs:extension>
    </xs:complexContent>
</xs:complexType>
</xs:schema>
```

Fig. 2C

```xml
<xs:schema xml:lang="en" targetNamespace="http://www.xfsi.com/2005/ebifx-i01"
xmlns:xs="http://www.w3.org/2001/XMLSchema" xmlns="http://www.xfsi.com/2005/ebifx-i01">
<!-- Inclusions -->
<xs:include schemaLocation="primitives.xsd"/>
<xs:include schemaLocation="refs.xsd"/>
<!-- Section 8.4 - General -->
<xs:complexType name="Tables.type">
  <xs:sequence>
        <xs:group ref="Table.class" minOccurs="0" maxOccurs="unbounded"/>
      </xs:sequence>
</xs:complexType>
<xs:group name="Table.class">
      <xs:choice>
                <xs:element name="ActionTable" type="ActionTable.type"/>
                <xs:element name="GenericDataTable" type="GenericDataTable.type"/>
                <xs:element name="MetadataTable" type="MetadataTable.type"/>
                <xs:element name="PaletteTable" type="PaletteTable.type"/>
                <xs:element name="PlatformDirectoryTable" type="PlatformDirectoryTable.type"/>
                <xs:element name="RefTable" type="RefTable.type"/>
                <xs:element name="ResourceLocatorTable" type="ResourceLocatorTable.type"/>
                <xs:element name="TriggerTable" type="TriggerTable.type"/>
                <xs:element name="WidgetTable" type="WidgetTable.type"/>
        </xs:choice>
</xs:group>
<xs:complexType name="Table.base">
  <xs:sequence>
    <xs:element name="TableHeader" type="TableHeader.type"/>
  </xs:sequence>
  <xs:attribute name="id" type="xs:ID" use="required"/>
</xs:complexType>
<xs:complexType name="TableHeader.type">
  <xs:sequence>
    <xs:element name="thRows" type="uint16"/>
    <xs:element name="thRowWidth" type="uint16"/>
    <xs:element name="thMetadata" type="uint16"/>
    <xs:element name="thMetadataCount" type="uint8"/>
    <xs:element name="thOffsetBase" type="uint24"/>
    <xs:element name="thColumns" type="uint8"/>
    <xs:element name="thReserved" type="reserved8"/>
    <xs:element name="Column" type="Column.type" minOccurs="0" maxOccurs="unbounded"/>
  </xs:sequence>
</xs:complexType>
<xs:complexType name="Column.type">
  <xs:sequence>
    <xs:element name="thColumnType" type="uint8"/>
    <xs:element name="thColumnWidth" type="uint8"/>
    <xs:element name="thColumnOffset" type="uint16"/>
  </xs:sequence>
</xs:complexType>
```

Fig. 3A

```xml
<!-- Section 9.1 - Action Table -->
<xs:complexType name="ActionTable.type">
    <xs:complexContent>
        <xs:extension base="Table.base">
            <xs:sequence>
                <xs:element name="Row" type="ActionRow.type" minOccurs="0" maxOccurs="unbounded"/>
            </xs:sequence>
        </xs:extension>
    </xs:complexContent>
</xs:complexType>
<xs:complexType name="ActionRow.type">
    <xs:sequence>
        <xs:element name="atAction" type="ActionOffset.type"/>
        <xs:element name="atNext" type="ActionIndex.type"/>
    </xs:sequence>
    <xs:attribute name="id" type="xs:ID" use="required"/>
</xs:complexType>
<!-- Section 9.2 - Generic Data Table -->
<xs:complexType name="GenericDataTable.type">
    <xs:complexContent>
        <xs:extension base="Table.base">
            <xs:sequence>
                <xs:element name="Row" type="GenericDataRow.type" minOccurs="0" maxOccurs="unbounded"/>
            </xs:sequence>
        </xs:extension>
    </xs:complexContent>
</xs:complexType>
<xs:complexType name="GenericDataRow.type">
    <xs:sequence>
        <xs:element name="Col" type="bitfield" minOccurs="1" maxOccurs="unbounded"/>
    </xs:sequence>
</xs:complexType>
<!-- Section 9.3 - Metadata Table -->
<xs:complexType name="MetadataTable.type">
    <xs:complexContent>
        <xs:extension base="Table.base">
            <xs:sequence>
                <xs:element name="Row" type="MetadataRow.type" minOccurs="0" maxOccurs="unbounded"/>
            </xs:sequence>
        </xs:extension>
    </xs:complexContent>
</xs:complexType>
<xs:complexType name="MetadataRow.type">
    <xs:sequence>
        <xs:element name="mtProperty" type="uint24"/> <!-- Column type 8 -->
        <xs:element name="mtValue" type="uint16"/> <!-- Column type 10 -->
    </xs:sequence>
</xs:complexType>
```

Fig. 3B

```xml
<!-- Section 9.4 - Palette Table -->
<xs:complexType name="PaletteTable.type">
  <xs:complexContent>
    <xs:extension base="Table.base">
      <xs:sequence>
        <xs:element name="Row" type="PaletteRow.type" minOccurs="0" maxOccurs="unbounded"/>
      </xs:sequence>
    </xs:extension>
  </xs:complexContent>
</xs:complexType>
<xs:complexType name="PaletteRow.type">
  <xs:sequence>
    <xs:element name="ptAlpha" type="uint8"/>  <!-- Column type 9 -->
    <xs:element name="ptRed" type="uint8"/>    <!-- Column type 9 -->
    <xs:element name="ptGreen" type="uint8"/>  <!-- Column type 9 -->
    <xs:element name="ptBlue" type="uint8"/>   <!-- Column type 9 -->
  </xs:sequence>
  <xs:attribute name="id" type="xs:ID" use="required"/>
</xs:complexType>
<!-- Section 9.5 - Platform Directory Table -->
<xs:complexType name="PlatformDirectoryTable.type">
  <xs:complexContent>
    <xs:extension base="Table.base">
      <xs:sequence>
        <xs:element name="Row" type="PlatformDirectoryRow.type" minOccurs="0" maxOccurs="unbounded"/>
      </xs:sequence>
    </xs:extension>
  </xs:complexContent>
</xs:complexType>
<xs:complexType name="PlatformDirectoryRow.type">
  <xs:sequence>
    <xs:element name="pdtHWManufacturer" type="uint24"/>  <!-- Column type 8 -->
    <xs:element name="pdtHWModel" type="int16"/>          <!-- Column type 2 -->
    <xs:element name="pdtHWVersion" type="int16"/>        <!-- Column type 2 -->
    <xs:element name="pdtSWManufacturer" type="uint24"/>  <!-- Column type 8 -->
    <xs:element name="pdtSWModel" type="int16"/>          <!-- Column type 2 -->
    <xs:element name="pdtSWVersion" type="int16"/>        <!-- Column type 2 -->
    <xs:element name="pdtProfile" type="int8"/>           <!-- Column type 1 -->
    <xs:element name="pdtSectionType" type="uint8"/>      <!-- Column type 9 -->
    <xs:element name="pdtSection" type="uint32"/>         <!-- Column type 14 (11?) -->
    <xs:element name="pdtMinLength" type="uint32"/>       <!-- Column type 11 -->
  </xs:sequence>
</xs:complexType>
<!-- Section 9.6 - Reference Table -->
<xs:complexType name="RefTable.type">
  <xs:complexContent>
    <xs:extension base="Table.base">
      <xs:sequence>
        <xs:element name="Row" type="RefEntry.type" minOccurs="0" maxOccurs="unbounded">
          <xs:annotation>
            <xs:documentation>See refs.xsd for definition of RefEntry.type</xs:documentation>
          </xs:annotation>
        </xs:element>
      </xs:sequence>
    </xs:extension>
  </xs:complexContent>
</xs:complexType>
```

Fig. 3C

```xml
<!-- Section 9.7 - Resource Locator Table -->
<xs:complexType name="ResourceLocatorTable.type">
   <xs:complexContent>
      <xs:extension base="Table.base">
         <xs:sequence>
            <xs:element name="Row" type="ResourceLocatorRow.type" minOccurs="0" maxOccurs="unbounded"/>
         </xs:sequence>
      </xs:extension>
   </xs:complexContent>
</xs:complexType>
<xs:complexType name="ResourceLocatorRow.type">
   <xs:sequence>
      <xs:element name="rltResource" type="uint24"/>   <!-- Column type 8 -->
      <xs:element name="rltLocator" type="uint16"/>  <!-- Column type 5 -->
   </xs:sequence>
</xs:complexType>
<!-- Section 9.8 - Trigger Table -->
<xs:complexType name="TriggerTable.type">
   <xs:complexContent>
      <xs:extension base="Table.base">
         <xs:sequence>
            <xs:element name="Row" type="TriggerRow.type" minOccurs="0" maxOccurs="unbounded"/>
         </xs:sequence>
      </xs:extension>
   </xs:complexContent>
</xs:complexType>
<xs:complexType name="TriggerRow.type">
   <xs:sequence>
      <xs:element name="ttSource" type="uint24"/>    <!-- Column type 8 -->
      <xs:element name="ttIdentifier" type="uint16"/> <!-- Column type 10 -->
      <xs:element name="ttFormat" type="uint16"/>    <!-- Column type 5 -->
      <xs:element name="ttDepth" type="uint8"/>      <!-- Column type 9 -->
   </xs:sequence>
</xs:complexType>
<!-- Section 9.9 - Widget Table -->
<xs:complexType name="WidgetTable.type">
   <xs:complexContent>
      <xs:extension base="Table.base">
         <xs:sequence>
            <xs:element name="Row" type="WidgetOffset.type" minOccurs="0" maxOccurs="unbounded"/>
         </xs:sequence>
      </xs:extension>
   </xs:complexContent>
</xs:complexType>
</xs:schema>
```

Fig. 3D

```xml
<xs:schema xml:lang="en" targetNamespace="http://www.xfsi.com/2005/ebifx-i01"
xmlns:xs="http://www.w3.org/2001/XMLSchema" xmlns="http://www.xfsi.com/2005/ebifx-i01">
  <!-- Inclusions -->
  <xs:include schemaLocation="primitives.xsd"/>
  <!-- Section 11 - General -->
  <xs:group name="Struct.class">
    <xs:choice>
      <xs:element name="AlignmentStyleStruct" type="AlignmentStyleStruct.type"/>
      <xs:element name="BorderStyleStruct" type="BorderStyleStruct.type"/>
      <xs:element name="ColorStyleStruct" type="ColorStyleStruct.type"/>
      <xs:element name="FontStyleStruct" type="FontStyleStruct.type"/>
      <xs:element name="NavigationMapStruct" type="NavigationMapStruct.type"/>
      <xs:element name="StyleStruct" type="StyleStruct.type"/>
      <xs:element name="WidgetExtensionsStruct" type="WidgetExtensionsStruct.type"/>
      <xs:element name="String" type="String.type"/>
      <xs:element name="EmbeddedResource" type="EmbeddedResource.type"/>
    </xs:choice>
  </xs:group>
  <xs:complexType name="Struct.base">
    <xs:attribute name="id" type="xs:ID" use="required"/>
  </xs:complexType>
  <xs:complexType name="String.type">
    <xs:simpleContent>
      <xs:extension base="string">
        <xs:attribute name="id" type="xs:ID" use="required"/>
        <xs:attribute name="mutable" type="xs:boolean"/>
        <xs:attribute name="maxLength" type="xs:unsignedShort" use="optional" default="0"/>
      </xs:extension>
    </xs:simpleContent>
  </xs:complexType>
  <xs:complexType name="EmbeddedResource.type">
    <xs:simpleContent>
      <xs:extension base="xs:hexBinary">
        <xs:attribute name="id" type="xs:ID" use="required"/>
      </xs:extension>
    </xs:simpleContent>
  </xs:complexType>
  <!-- Section 11.1 - Alignment Style -->
  <xs:complexType name="AlignmentStyleStruct.type">
    <xs:complexContent>
      <xs:extension base="Struct.base">
        <xs:sequence>
          <xs:element name="asHAlign" type="int8"/>
          <xs:element name="asVAlign" type="int8"/>
        </xs:sequence>
      </xs:extension>
    </xs:complexContent>
  </xs:complexType>
```

Fig. 4A

```xml
<!-- Section 11.3 - Border Style -->
<xs:complexType name="BorderStyleStruct.type">
   <xs:complexContent>
      <xs:extension base="Struct.base">
         <xs:sequence>
            <xs:element name="bsStyle" type="nybble"/>
            <xs:element name="bsJoinStyle" type="nybble"/>
            <xs:element name="bsJoinRadius" type="uint8"/>
            <xs:element name="bsThickness" type="uint8"/>
            <xs:element name="bsLeftColor" type="ColorStyleOffset.type"/>
            <xs:element name="bsTopColor" type="ColorStyleOffset.type"/>
            <xs:element name="bsRightColor" type="ColorStyleOffset.type"/>
            <xs:element name="bsBottomColor" type="ColorStyleOffset.type"/>
         </xs:sequence>
      </xs:extension>
   </xs:complexContent>
</xs:complexType>
<!-- Section 11.4 - Color Style -->
<xs:complexType name="ColorStyleStruct.type">
   <xs:complexContent>
      <xs:extension base="Struct.base">
         <xs:sequence>
            <xs:element name="csType" type="nybble"/>
            <xs:element name="csReserved" type="reserved4"/>
            <xs:element name="csEnabled" type="uint32"/>
            <xs:element name="csFocused" type="uint32"/>
            <xs:element name="csSelected" type="uint32"/>
            <xs:element name="csDisabled" type="uint32"/>
         </xs:sequence>
      </xs:extension>
   </xs:complexContent>
</xs:complexType>
<!-- Section 11.7 - Fonts -->
<xs:complexType name="FontStruct.type">
   <xs:complexContent>
      <xs:extension base="Struct.base">
         <xs:sequence>
            <xs:element name="fsNumFonts" type="uint8"/>
            <xs:element name="Font" type="FontsEntry.type" minOccurs="0" maxOccurs="unbounded">
            </xs:element>
         </xs:sequence>
      </xs:extension>
   </xs:complexContent>
</xs:complexType>
<xs:complexType name="FontsEntry.type">
      <xs:sequence>
            <xs:element name="fsFamily" type="uint24"/>
            <xs:element name="fsSize" type="uint8"/>
            <xs:element name="fsShadow" type="bool8"/>
            <xs:element name="fsBold" type="bool8"/>
            <xs:element name="fsItalic" type="bool8"/>
      </xs:sequence>
</xs:complexType>
```

Fig. 4B

```xml
<!-- Section 11.8 - Font Style -->
<xs:complexType name="FontStyleStruct.type">
   <xs:complexContent>
      <xs:extension base="Struct.base">
         <xs:sequence>
            <xs:element name="fsEnabled" type="uint8"/>
            <xs:element name="fsFocused" type="uint8"/>
            <xs:element name="fsSelected" type="uint8"/>
            <xs:element name="fsDisabled" type="uint8"/>
         </xs:sequence>
      </xs:extension>
   </xs:complexContent>
</xs:complexType>
<!-- Section 11.11 - Navigation Map -->
<xs:complexType name="NavigationMapStruct.type">
   <xs:complexContent>
      <xs:extension base="Struct.base">
         <xs:sequence>
            <xs:element name="nsNumNavigableWidgets" type="uint8"/>
            <xs:element name="Entry" type="NavigationMapEntry.type" minOccurs="0" maxOccurs="unbounded"/>
         </xs:sequence>
      </xs:extension>
   </xs:complexContent>
</xs:complexType>
<xs:complexType name="NavigationMapEntry.type">
   <xs:sequence>
      <xs:element name="nsOwningIndex" type="uint16"/>
      <xs:element name="nsRowIndex" type="uint16"/>
      <xs:element name="nsUpTargetIndex" type="uint8"/>
      <xs:element name="nsDownTargetIndex" type="uint8"/>
      <xs:element name="nsLeftTargetIndex" type="uint8"/>
      <xs:element name="nsRightTargetIndex" type="uint8"/>
   </xs:sequence>
   <xs:attribute name="id" type="xs:ID" use="required"/>
</xs:complexType>
<!-- Section 11.12 - Style -->
<xs:complexType name="StyleStruct.type">
   <xs:complexContent>
      <xs:extension base="Struct.base">
         <xs:sequence>
            <xs:element name="ssAlignment" type="AlignmentStyleOffset.type"/>
            <xs:element name="ssBG1" type="ColorStyleOffset.type"/>
            <xs:element name="ssBG2" type="ColorStyleOffset.type"/>
            <xs:element name="ssFG1" type="ColorStyleOffset.type"/>
            <xs:element name="ssFG2" type="ColorStyleOffset.type"/>
            <xs:element name="ssBorder" type="BorderStyleOffset.type"/>
            <xs:element name="ssFont" type="FontStyleOffset.type"/>
            <xs:element name="ssExtensions" type="WidgetExtensionsStructOffset.type"/>
         </xs:sequence>
      </xs:extension>
   </xs:complexContent>
</xs:complexType>
```

Fig. 4C

```xml
<!-- Section 11.15 - Widget Extensions -->
<xs:complexType name="WidgetExtensionsStruct.type">
    <xs:complexContent>
        <xs:extension base="Struct.base">
            <xs:sequence>
                <xs:element name="wxsCount" type="uint8"/>
                <xs:element name="Extension" type="WidgetExtension.type" minOccurs="0" maxOccurs="unbounded"/>
            </xs:sequence>
        </xs:extension>
    </xs:complexContent>
</xs:complexType>
<xs:complexType name="WidgetExtension.type">
    <xs:sequence>
        <xs:element name="wxsProperty" type="uint24"/>
        <xs:element name="wxsValue" type="uint16"/>
    </xs:sequence>
</xs:complexType>
</xs:schema>
```

Fig. 4D

```xml
<xs:schema xml:lang="en" targetNamespace="http://www.xfsi.com/2005/ebifx-i01"
xmlns:xs="http://www.w3.org/2001/XMLSchema" xmlns="http://www.xfsi.com/2005/ebifx-i01">
   <!-- Inclusions -->
   <xs:include schemaLocation="primitives.xsd"/>
   <!-- Section 9.6 -->
   <xs:complexType name="RefEntry.type">
      <xs:sequence>
         <xs:element name="rtType" type="uint8"/>
         <xs:element name="rfExtension" type="bool1"/>
         <xs:element name="rfCritical" type="bool1"/>
         <xs:element name="rfOriginalStringReference" type="bool1"/>
         <xs:element name="rfReadOnly" type="bool1"/>
         <xs:element name="rfReserved" type="reserved4"/>
         <!-- Data from fields rtByte0-5 is accounted for in the fields of each type of reference. -->
      </xs:sequence>
      <xs:attribute name="id" type="xs:ID" use="required"/>
   </xs:complexType>
   <!-- Section 9.6.7 - Widget Reference (5) -->
   <xs:complexType name="WidgetRef.type">
      <xs:complexContent>
         <xs:extension base="RefEntry.type">
            <xs:sequence>
               <xs:element name="rf3WidgetTable" type="TableDirectoryIndexOrRefTableIndex.type"/>
               <xs:element name="rf3Widget" type="RowIndexOrRefTableIndex.type"/>
               <xs:element name="rf3Identifier" type="uint8"/>
               <xs:element name="rf3Reserved" type="reserved8"/>
            </xs:sequence>
         </xs:extension>
      </xs:complexContent>
   </xs:complexType>
   <!-- Section 9.6.9 - Environment Property Reference (7) -->
   <xs:complexType name="EnvironmentPropertyRef.type">
      <xs:complexContent>
         <xs:extension base="RefEntry.type">
            <xs:sequence>
               <xs:element name="rf4Property" type="uint8"/>
               <xs:element name="rf4Byte" type="uint8" minOccurs="5" maxOccurs="5"/>
            </xs:sequence>
         </xs:extension>
      </xs:complexContent>
   </xs:complexType>
   <!-- Section 9.6.10 - String Reference (8) -->
   <xs:complexType name="StringRef.type">
      <xs:complexContent>
         <xs:extension base="RefEntry.type">
            <xs:sequence>
               <xs:element name="rf3Offset" type="StringOffset.type"/>
               <xs:element name="rf3Reserved" type="reserved32"/>
            </xs:sequence>
         </xs:extension>
      </xs:complexContent>
   </xs:complexType>
   <!-- Section 9.6.12 - Integer Reference (10) -->
   <xs:complexType name="IntegerRef.type">
      <xs:complexContent>
         <xs:extension base="RefEntry.type">
            <xs:sequence>
               <xs:element name="rf7Value" type="int32"/>
               <xs:element name="rf7Reserved" type="reserved16"/>
            </xs:sequence>
         </xs:extension>
      </xs:complexContent>
   </xs:complexType>
</xs:schema>
```

Fig. 5

```xml
<xs:schema xml:lang="en" targetNamespace="http://www.xfsi.com/2005/ebifx-i01"
xmlns:xs="http://www.w3.org/2001/XMLSchema" xmlns="http://www.xfsi.com/2005/ebifx-i01">
  <xs:simpleType name="bit">
    <xs:restriction base="xs:byte">
      <xs:minInclusive value="0"/>
      <xs:maxInclusive value="1"/>
    </xs:restriction>
  </xs:simpleType>
  <xs:simpleType name="bool1">
    <xs:restriction base="xs:boolean"/>
  </xs:simpleType>
  <xs:simpleType name="bool8">
    <xs:restriction base="xs:unsignedByte">
      <xs:enumeration value="255"/> <!-- True -->
      <xs:enumeration value="0"/>   <!-- False -->
    </xs:restriction>
  </xs:simpleType>
  <xs:simpleType name="nybble">
    <xs:restriction base="xs:unsignedByte">
      <xs:maxInclusive value="15"/>
    </xs:restriction>
  </xs:simpleType>
  <xs:simpleType name="uint7">
    <xs:restriction base="xs:unsignedByte">
      <xs:maxInclusive value="127"/>
    </xs:restriction>
  </xs:simpleType>
  <xs:simpleType name="int8">
    <xs:restriction base="xs:byte"/>
  </xs:simpleType>
  <xs:simpleType name="uint8">
    <xs:restriction base="xs:unsignedByte"/>
  </xs:simpleType>
  <xs:simpleType name="int16">
    <xs:restriction base="xs:short"/>
  </xs:simpleType>
  <xs:simpleType name="uint16">
    <xs:restriction base="xs:unsignedShort"/>
  </xs:simpleType>
  <xs:simpleType name="uint24">
    <xs:restriction base="xs:unsignedInt">
      <xs:maxInclusive value="16777216"/>
    </xs:restriction>
  </xs:simpleType>
  <xs:simpleType name="int32">
    <xs:restriction base="xs:int"/>
  </xs:simpleType>
  <xs:simpleType name="uint32">
    <xs:restriction base="xs:unsignedInt"/>
  </xs:simpleType>
  <xs:simpleType name="bitfield">
    <xs:restriction base="xs:hexBinary"/>
  </xs:simpleType>
  <xs:simpleType name="string">
    <xs:restriction base="xs:string"/>
  </xs:simpleType>
  <xs:simpleType name="reserved4">
    <xs:restriction base="xs:unsignedByte">
      <xs:maxInclusive value="15"/>
    </xs:restriction>
  </xs:simpleType>
```

Fig. 6A

```xml
<xs:simpleType name="reserved8">
  <xs:restriction base="xs:unsignedByte"/>
</xs:simpleType>
<xs:simpleType name="reserved14">
  <xs:restriction base="xs:unsignedShort">
    <xs:maxInclusive value="16384"/>
  </xs:restriction>
</xs:simpleType>
<xs:simpleType name="reserved16">
  <xs:restriction base="xs:unsignedShort"/>
</xs:simpleType>
<xs:simpleType name="reserved32">
  <xs:restriction base="xs:unsignedInt"/>
</xs:simpleType>
<xs:complexType name="reserved8Array">
  <xs:sequence>
    <xs:element name="value" type="int8" minOccurs="0" maxOccurs="unbounded"/>
  </xs:sequence>
</xs:complexType>
<!-- base types used below -->
<xs:simpleType name="TableIndex.base"> <!-- Index to a table -->
  <xs:restriction base="xs:unsignedShort"/>
</xs:simpleType>
<xs:simpleType name="OptTableIndex.base">
  <xs:restriction base="xs:short">
    <xs:minInclusive value="-1"/>
    <xs:maxInclusive value="32767"/>
  </xs:restriction>
</xs:simpleType>
<!-- Index to a reference table (different from TableIndex b/c last element is reserved) -->
<xs:simpleType name="RefIndexBase.type">
  <xs:restriction base="TableIndex.base">
    <xs:maxInclusive value="65534"/>
  </xs:restriction>
</xs:simpleType>
<xs:simpleType name="OptRefIndexBase.type">
  <xs:restriction base="xs:short">
    <xs:minInclusive value="-1"/>
    <xs:maxInclusive value="32767"/>
  </xs:restriction>
</xs:simpleType>
<!-- Offsets into the heap -->
<xs:complexType name="HeapOffset.type">
  <xs:simpleContent>
    <xs:extension base="xs:unsignedShort">
      <xs:attribute name="ref" type="xs:IDREF" use="required"/>
    </xs:extension>
  </xs:simpleContent>
</xs:complexType>
<xs:complexType name="OptHeapOffset.type">
  <xs:simpleContent>
    <xs:extension base="xs:short">
      <xs:attribute name="ref" type="xs:IDREF" use="optional"/>
    </xs:extension>
  </xs:simpleContent>
</xs:complexType>
```

Fig. 6B

```xml
<!-- Reference table index -->
<xs:complexType name="RefIndex.type">
  <xs:simpleContent>
    <xs:extension base="RefIndexBase.type">
      <xs:attribute name="ref" type="xs:IDREF" use="required"/>
    </xs:extension>
  </xs:simpleContent>
</xs:complexType>
<xs:complexType name="OptRefIndex.type"> <!-- NOTE: Check out how these work. If not there, is it always -1? See bwText field. -->
  <xs:simpleContent>
    <xs:extension base="OptRefIndexBase.type">
      <xs:attribute name="ref" type="xs:IDREF" use="optional"/>
    </xs:extension>
  </xs:simpleContent>
</xs:complexType>
<!-- Widget table index -->
<xs:complexType name="WidgetTableIndex.type">
  <xs:simpleContent>
    <xs:extension base="TableIndex.base">
      <xs:attribute name="ref" type="xs:IDREF" use="required"/>
    </xs:extension>
  </xs:simpleContent>
</xs:complexType>
<xs:complexType name="OptWidgetTableIndex.type"> <!-- NOTE: If not there, is it always -1? See cwTableIndex, but spec doesn't say -->
  <xs:simpleContent>
    <xs:extension base="OptTableIndex.base">
      <xs:attribute name="ref" type="xs:IDREF" use="optional"/>
    </xs:extension>
  </xs:simpleContent>
</xs:complexType>
<!-- Action table (handler) index -->
<xs:complexType name="ActionIndex.type">
  <xs:simpleContent>
    <xs:extension base="TableIndex.base">
      <xs:attribute name="ref" type="xs:IDREF" use="required"/>
    </xs:extension>
  </xs:simpleContent>
</xs:complexType>
<!-- Action reference -->
<xs:complexType name="ActionOffset.type">
  <xs:simpleContent>
    <xs:restriction base="HeapOffset.type"/>
  </xs:simpleContent>
</xs:complexType>
<!-- String reference -->
<xs:complexType name="StringOffset.type">
  <xs:simpleContent>
    <xs:restriction base="HeapOffset.type"/>
  </xs:simpleContent>
</xs:complexType>
<!-- Widget reference -->
<xs:complexType name="WidgetOffset.type">
  <xs:simpleContent>
    <xs:restriction base="HeapOffset.type"/>
  </xs:simpleContent>
</xs:complexType>
```

Fig. 6C

```xml
<!-- Alignment style struct reference -->
<xs:complexType name="AlignmentStyleOffset.type">
    <xs:simpleContent>
        <xs:restriction base="HeapOffset.type"/>
    </xs:simpleContent>
</xs:complexType>
<!-- Border style struct reference -->
<xs:complexType name="BorderStyleOffset.type">
    <xs:simpleContent>
        <xs:restriction base="HeapOffset.type"/>
    </xs:simpleContent>
</xs:complexType>
<!-- Color style struct reference -->
<xs:complexType name="ColorStyleOffset.type">
    <xs:simpleContent>
        <xs:restriction base="HeapOffset.type"/>
    </xs:simpleContent>
</xs:complexType>
<!-- Font style struct reference -->
<xs:complexType name="FontStyleOffset.type">
    <xs:simpleContent>
        <xs:restriction base="HeapOffset.type"/>
    </xs:simpleContent>
</xs:complexType>
<!-- NavMap struct reference -->
<xs:complexType name="NavMapOffset.type">
    <xs:simpleContent>
        <xs:restriction base="HeapOffset.type"/>
    </xs:simpleContent>
</xs:complexType>
<xs:complexType name="OptNavMapOffset.type">
    <xs:simpleContent>
        <xs:restriction base="OptHeapOffset.type"/>
    </xs:simpleContent>
</xs:complexType>
<!-- Style struct reference -->
<xs:complexType name="StyleOffset.type">
    <xs:simpleContent>
        <xs:restriction base="HeapOffset.type"/>
    </xs:simpleContent>
</xs:complexType>
<!-- Widget extensions struct reference -->
<xs:complexType name="WidgetExtensionsStructOffset.type">
    <xs:simpleContent>
        <xs:restriction base="HeapOffset.type"/>
    </xs:simpleContent>
</xs:complexType>
<!-- Events reference -->
<xs:complexType name="EventsOffset.type">
    <xs:simpleContent>
        <xs:restriction base="HeapOffset.type"/>
    </xs:simpleContent>
</xs:complexType>
<xs:complexType name="OptEventsOffset.type">
    <xs:simpleContent>
        <xs:restriction base="OptHeapOffset.type"/>
    </xs:simpleContent>
</xs:complexType>
```

Fig. 6D

```
<!-- Miscellaneous -->
<xs:simpleType name="TableDirectoryIndexOrRefTableIndex.type"> <!-- If positive, a table directory index. Else reftable index. -->
    <xs:restriction base="xs:short"/>
</xs:simpleType>
<xs:simpleType name="RowIndexOrRefTableIndex.type"> <!-- If positive, a row of a previously referenced table. Else reftable index. -->
    <xs:restriction base="xs:short"/>
</xs:simpleType>
</xs:schema>
```

Fig. 6E

```xml
<xs:schema xml:lang="en" targetNamespace="http://www.xfsi.com/2005/ebifx-i01"
xmlns:xs="http://www.w3.org/2001/XMLSchema" xmlns="http://www.xfsi.com/2005/ebifx-i01">
  <!-- Inclusions -->
  <xs:include schemaLocation="primitives.xsd"/>
  <xs:include schemaLocation="tables.xsd"/>
  <xs:include schemaLocation="actions.xsd"/>
  <xs:include schemaLocation="widgets.xsd"/>
  <xs:include schemaLocation="refs.xsd"/>
  <xs:include schemaLocation="structs.xsd"/>
  <!-- Section 8 -->
  <xs:element name="Resource" type="Resource.type"/>
  <xs:complexType name="Resource.type">
    <xs:sequence>
      <xs:element name="ResourceHeader" type="ResourceHeader.type"/>
      <xs:element name="Section" type="Section.type" minOccurs="1" maxOccurs="unbounded"/>
    </xs:sequence>
  </xs:complexType>
  <xs:complexType name="Section.type">
    <xs:sequence>
      <xs:element name="SectionHeader" type="SectionHeader.type"/>
      <xs:element name="TableDirectory" type="TableDirectory.type"/>
      <xs:element name="Tables" type="Tables.type" minOccurs="0" maxOccurs="1"/>
      <xs:element name="Heap" type="Heap.type" minOccurs="0" maxOccurs="1"/>
    </xs:sequence>
    <xs:attribute name="type" use="required">
      <xs:simpleType>
        <xs:restriction base="xs:token">
          <xs:enumeration value="common"/>
          <xs:enumeration value="platform"/>
        </xs:restriction>
      </xs:simpleType>
    </xs:attribute>
  </xs:complexType>
  <xs:complexType name="Heap.type">
    <xs:sequence minOccurs="0" maxOccurs="unbounded">
      <xs:choice>
        <xs:group ref="Action.class"/>
        <xs:group ref="Widget.class"/>
        <xs:group ref="Struct.class"/>
      </xs:choice>
    </xs:sequence>
  </xs:complexType>
  <!-- Section 8.1 -->
  <xs:complexType name="ResourceHeader.type">
    <xs:sequence>
      <xs:element name="rhMagic" type="bitfield"/>
      <xs:element name="rhMajor" type="uint8"/>
      <xs:element name="rhMinor" type="uint8"/>
      <xs:element name="rhType" type="uint8"/>
      <xs:element name="rhHeaderExtensionLength" type="uint8"/>
      <xs:element name="rhPrivateUseScope" type="uint24"/>
      <xs:element name="rhPrivateUseScopeParam" type="uint8"/>
      <xs:element name="rhPrivateUseCritical" type="bool1"/>
      <xs:element name="rhReservedExtensionCritical" type="bool1"/>
      <xs:element name="rhReserved" type="reserved14"/>
      <xs:element name="rhHeaderExtension" type="reserved8Array"/>
    </xs:sequence>
  </xs:complexType>
```

Fig. 7A

```xml
<!-- Section 8.2 -->
<xs:complexType name="SectionHeader.type">
  <xs:sequence>
    <xs:element name="shLength" type="uint24"/>
    <xs:element name="shHeapOffset" type="uint24"/>
    <xs:element name="shHeapLength" type="uint24"/>
    <xs:element name="shHeaderExtensionLength" type="uint8"/>
    <xs:element name="shHeaderExtension" type="reserved8Array"/>
  </xs:sequence>
</xs:complexType>
<!-- Section 8.3 -->
<xs:complexType name="TableDirectory.type">
  <xs:sequence>
    <xs:element name="tdCount" type="uint16"/>
    <xs:element name="Entry" type="TableDirectoryEntry.type" minOccurs="0" maxOccurs="unbounded"/>
  </xs:sequence>
</xs:complexType>
<xs:complexType name="TableDirectoryEntry.type">
  <xs:sequence>
    <xs:element name="tdExternal" type="bool1"/>
    <xs:element name="tdType" type="uint7"/>
    <xs:choice>
      <xs:element name="tdOffset" type="uint24"/>
      <xs:element name="tdResource" type="uint24"/>
    </xs:choice>
  </xs:sequence>
  <xs:attribute name="ref" type="xs:IDREF" use="required"/>
</xs:complexType>
</xs:schema>
```

Fig. 7B

```xml
<?xml version="1.0" encoding="UTF-8"?>
<Project>
    <Folder FolderName="XML Files" ExtStr="xml;cml;math;mtx;rdf;smil;svg;wml"/>
    <Folder FolderName="XSL Files" ExtStr="xsl;xslt"/>
    <Folder FolderName="XQuery Files" ExtStr="xq;xql;xquery"/>
    <Folder FolderName="HTML Files" ExtStr="html;htm;xhtml;asp"/>
    <Folder FolderName="DTD/Schemas" ExtStr="dtd;dcd;xdr;biz;xsd">
        <File FilePath=".\actions.xsd" HomeFolder="Yes"/>
        <File FilePath=".\ebifx.xsd" HomeFolder="Yes"/>
        <File FilePath=".\primitives.xsd" HomeFolder="Yes"/>
        <File FilePath=".\refs.xsd" HomeFolder="Yes"/>
        <File FilePath=".\structs.xsd" HomeFolder="Yes"/>
        <File FilePath=".\tables.xsd" HomeFolder="Yes"/>
        <File FilePath=".\widgets.xsd" HomeFolder="Yes"/>
    </Folder>
    <Folder FolderName="Entities" ExtStr="ent"/>
</Project>
```

Fig. 7C

```xml
<xs:schema xml:lang="en" targetNamespace="http://www.xfsi.com/2005/ebifx-i01"
xmlns:xs="http://www.w3.org/2001/XMLSchema" xmlns="http://www.xfsi.com/2005/ebifx-i01">
<!-- Inclusions -->
<xs:include schemaLocation="primitives.xsd"/>
<!-- Section A -->
<xs:complexType name="Action.base">
    <xs:sequence>
        <xs:element name="opCode" type="int8"/>
    </xs:sequence>
    <xs:attribute name="id" type="xs:ID" use="required"/>
</xs:complexType>
<xs:group name="Action.class">
        <xs:choice>
                <xs:element name="Add" type="Add.type"/>
                <xs:element name="AddImmediate" type="AddImmediate.type"/>
                <xs:element name="AddWidget" type="AddWidget.type"/>
                <xs:element name="BitwiseAnd" type="BitwiseAnd.type"/>
                <xs:element name="BitwiseAndImmediate" type="BitwiseAndImmediate.type"/>
                <xs:element name="BitwiseComplement" type="BitwiseComplement.type"/>
                <xs:element name="BitwiseOr" type="BitwiseOr.type"/>
                <xs:element name="BitwiseOrImmediate" type="BitwiseOrImmediate.type"/>
                <xs:element name="Call" type="Call.type"/>
                <xs:element name="ConjunctiveIf" type="ConjunctiveIf.type"/>
                <xs:element name="DisjunctiveIf" type="DisjunctiveIf.type"/>
                <xs:element name="Divide" type="Divide.type"/>
                <xs:element name="DivideImmediate" type="DivideImmediate.type"/>
                <xs:element name="Filter" type="Filter.type"/>
                <xs:element name="GetFocus" type="GetFocus.type"/>
                <xs:element name="GetTableRows" type="GetTableRows.type"/>
                <xs:element name="HideWidget" type="HideWidget.type"/>
                <xs:element name="If" type="If.type"/>
                <xs:element name="LoadApplication" type="LoadApplication.type"/>
                <xs:element name="LoadPage" type="LoadPage.type"/>
                <xs:element name="LogicalAnd" type="LogicalAnd.type"/>
                <xs:element name="LogicalComplement" type="LogicalComplement.type"/>
                <xs:element name="LogicalOr" type="LogicalOr.type"/>
                <xs:element name="Modulo" type="Modulo.type"/>
                <xs:element name="ModuloImmediate" type="ModuloImmediate.type"/>
                <xs:element name="Multiply" type="Multiply.type"/>
                <xs:element name="MultiplyImmediate" type="MultiplyImmediate.type"/>
                <xs:element name="Negate" type="Negate.type"/>
                <xs:element name="Noop" type="Noop.type"/>
                <xs:element name="PopDecodedTrigger" type="PopDecodedTrigger.type"/>
                <xs:element name="Random" type="Random.type"/>
                <xs:element name="RedrawWidget" type="RedrawWidget.type"/>
                <xs:element name="RemoveFilteredDataTable" type="RemoveFilteredDataTable.type"/>
                <xs:element name="RemovePersistentStateItem" type="RemovePersistentStateItem.type"/>
                <xs:element name="RemoveWidget" type="RemoveWidget.type"/>
                <xs:element name="ResetWidget" type="ResetWidget.type"/>
                <xs:element name="Resume" type="Resume.type"/>
                <xs:element name="SelectService" type="SelectService.type"/>
                <xs:element name="SelectServiceComponent" type="SelectServiceComponent.type"/>
                <xs:element name="Set" type="Set.type"/>
                <xs:element name="SetFocus" type="SetFocus.type"/>
                <xs:element name="SetImmediate" type="SetImmediate.type"/>
```

Fig. 8A

```xml
            <xs:element name="SetWidgetProperty" type="SetWidgetProperty.type"/>
            <xs:element name="SetWidgetPropertyImmediate" type="SetWidgetPropertyImmediate.type"/>
            <xs:element name="ShowWidget" type="ShowWidget.type"/>
            <xs:element name="StartTimer" type="StartTimer.type"/>
            <xs:element name="StopTimer" type="StopTimer.type"/>
            <xs:element name="StringAppend" type="StringAppend.type"/>
            <xs:element name="StringClear" type="StringClear.type"/>
            <xs:element name="StringExtract" type="StringExtract.type"/>
            <xs:element name="StringLength" type="StringLength.type"/>
            <xs:element name="StringSearch" type="StringSearch.type"/>
            <xs:element name="SubmitForm" type="SubmitForm.type"/>
            <xs:element name="Subtract" type="Subtract.type"/>
            <xs:element name="SubtractImmediate" type="SubtractImmediate.type"/>
            <xs:element name="Suspend" type="Suspend.type"/>
            <xs:element name="Terminate" type="Terminate.type"/>
            <xs:element name="Test" type="Test.type"/>
            <xs:element name="TestImmediate" type="TestImmediate.type"/>
        </xs:choice>
</xs:group>
<!-- Section A.1 - ADD (0x10) -->
<xs:complexType name="Add.type">
    <xs:complexContent>
        <xs:extension base="Action.base"/>
    </xs:complexContent>
</xs:complexType>
<!-- Section A.2 - ADD IMMEDIATE (0x11) -->
<xs:complexType name="AddImmediate.type">
    <xs:complexContent>
        <xs:extension base="Action.base"/>
    </xs:complexContent>
</xs:complexType>
<!-- Section A.3 - ADD WIDGET (0x86) -->
<xs:complexType name="AddWidget.type">
    <xs:complexContent>
        <xs:extension base="Action.base"/>
    </xs:complexContent>
</xs:complexType>
<!-- Section A.4 - BITWISE AND (0x20) -->
<xs:complexType name="BitwiseAnd.type">
    <xs:complexContent>
        <xs:extension base="Action.base"/>
    </xs:complexContent>
</xs:complexType>
<!-- Section A.5 - BITWISE AND IMMEDIATE (0x21) -->
<xs:complexType name="BitwiseAndImmediate.type">
    <xs:complexContent>
        <xs:extension base="Action.base"/>
    </xs:complexContent>
</xs:complexType>
<!-- Section A.6 - BITWISE COMPLEMENT (0x24) -->
        <xs:complexType name="BitwiseComplement.type">
            <xs:complexContent>
                <xs:extension base="Action.base"/>
            </xs:complexContent>
</xs:complexType>
```

Fig. 8B

```xml
<!-- Section A.7 - BITWISE OR (0x22) -->
<xs:complexType name="BitwiseOr.type">
   <xs:complexContent>
         <xs:extension base="Action.base"/>
   </xs:complexContent>
</xs:complexType>
<!-- Section A.8 - BITWISE OR IMMEDIATE (0x23) -->
         <xs:complexType name="BitwiseOrImmediate.type">
            <xs:complexContent>
                  <xs:extension base="Action.base"/>
            </xs:complexContent>
</xs:complexType>
<!-- Section A.9 - CALL (0x01) -->
<xs:complexType name="Call.type">
   <xs:complexContent>
         <xs:extension base="Action.base"/>
   </xs:complexContent>
</xs:complexType>
<!-- Section A.10 - CONJUNCTIVE IF (0x03) -->
<xs:complexType name="ConjunctiveIf.type">
   <xs:complexContent>
         <xs:extension base="Action.base"/>
   </xs:complexContent>
</xs:complexType>
<!-- Section A.11 - DISJUNCTIVE IF (0x04) -->
<xs:complexType name="DisjunctiveIf.type">
   <xs:complexContent>
         <xs:extension base="Action.base"/>
   </xs:complexContent>
</xs:complexType>
<!-- Section A.12 - DIVIDE (0x16) -->
<xs:complexType name="Divide.type">
   <xs:complexContent>
         <xs:extension base="Action.base"/>
   </xs:complexContent>
</xs:complexType>
<!-- Section A.13 - DIVIDE IMMEDIATE (0x17) -->
<xs:complexType name="DivideImmediate.type">
   <xs:complexContent>
         <xs:extension base="Action.base"/>
   </xs:complexContent>
</xs:complexType>
<!-- Section A.14 - FILTER (0x91) -->
<xs:complexType name="Filter.type">
   <xs:complexContent>
         <xs:extension base="Action.base"/>
   </xs:complexContent>
</xs:complexType>
<!-- Section A.15 - GET FOCUS (0x85) -->
<xs:complexType name="GetFocus.type">
   <xs:complexContent>
         <xs:extension base="Action.base"/>
   </xs:complexContent>
</xs:complexType>
```

Fig. 8C

```xml
<!-- Section A.16 - GET TABLE ROWS (0x90) -->
<xs:complexType name="GetTableRows.type">
    <xs:complexContent>
        <xs:extension base="Action.base"/>
    </xs:complexContent>
</xs:complexType>
<!-- Section A.17 - HIDE WIDGET (0x82) -->
<xs:complexType name="HideWidget.type">
    <xs:complexContent>
        <xs:extension base="Action.base"/>
    </xs:complexContent>
</xs:complexType>
<!-- Section A.18 - IF (0x02) -->
<xs:complexType name="If.type">
    <xs:complexContent>
        <xs:extension base="Action.base"/>
    </xs:complexContent>
</xs:complexType>
<!-- Section A.19 - LOAD APPLICATION (0x75) -->
<xs:complexType name="LoadApplication.type">
    <xs:complexContent>
        <xs:extension base="Action.base"/>
    </xs:complexContent>
</xs:complexType>
<!-- Section A.20 - LOAD PAGE (0x76) -->
<xs:complexType name="LoadPage.type">
    <xs:complexContent>
        <xs:extension base="Action.base"/>
    </xs:complexContent>
</xs:complexType>
<!-- Section A.21 - LOGICAL AND (0x26) -->
<xs:complexType name="LogicalAnd.type">
    <xs:complexContent>
        <xs:extension base="Action.base"/>
    </xs:complexContent>
</xs:complexType>
<!-- Section A.22 - LOGICAL OR (0x28) -->
<xs:complexType name="LogicalOr.type">
    <xs:complexContent>
        <xs:extension base="Action.base"/>
    </xs:complexContent>
</xs:complexType>
<!-- Section A.23 - LOGICAL COMPLEMENT (0x2A) -->
<xs:complexType name="LogicalComplement.type">
    <xs:complexContent>
        <xs:extension base="Action.base"/>
    </xs:complexContent>
</xs:complexType>
<!-- Section A.24 - MODULO (0x18) -->
<xs:complexType name="Modulo.type">
    <xs:complexContent>
        <xs:extension base="Action.base"/>
    </xs:complexContent>
</xs:complexType>
```

Fig. 8D

```xml
<!-- Section A.25 - MODULO IMMEDIATE (0x19) -->
<xs:complexType name="ModuloImmediate.type">
    <xs:complexContent>
        <xs:extension base="Action.base"/>
    </xs:complexContent>
</xs:complexType>
<!-- Section A.26 - MULTIPLY (0x14) -->
<xs:complexType name="Multiply.type">
    <xs:complexContent>
        <xs:extension base="Action.base"/>
    </xs:complexContent>
</xs:complexType>
<!-- Section A.27 - MULTIPLE IMMEDIATE (0x15) -->
<xs:complexType name="MultiplyImmediate.type">
    <xs:complexContent>
        <xs:extension base="Action.base"/>
    </xs:complexContent>
</xs:complexType>
<!-- Section A.28 - NEGATE (0x1A) -->
<xs:complexType name="Negate.type">
    <xs:complexContent>
        <xs:extension base="Action.base"/>
    </xs:complexContent>
</xs:complexType>
<!-- Section A.29 - NOOP (0x00) -->
<xs:complexType name="Noop.type">
    <xs:complexContent>
        <xs:extension base="Action.base"/>
    </xs:complexContent>
</xs:complexType>
<!-- Section A.30 - POP DECODED TRIGGER (0x93) -->
<xs:complexType name="PopDecodedTrigger.type">
    <xs:complexContent>
        <xs:extension base="Action.base"/>
    </xs:complexContent>
</xs:complexType>
<!-- Section A.31 - RANDOM (0x30) -->
<xs:complexType name="Random.type">
    <xs:complexContent>
        <xs:extension base="Action.base"/>
    </xs:complexContent>
</xs:complexType>
<!-- Section A.32 - REDRAW WIDGET (0x81) -->
<xs:complexType name="RedrawWidget.type">
    <xs:complexContent>
        <xs:extension base="Action.base">
            <xs:sequence>
                <xs:element name="widgetIndex" type="RefIndex.type"/>
            </xs:sequence>
        </xs:extension>
    </xs:complexContent>
</xs:complexType>
<!-- Section A.33 - REMOVE FILTERED DATA TABLE (0x92) -->
<xs:complexType name="RemoveFilteredDataTable.type">
    <xs:complexContent>
        <xs:extension base="Action.base"/>
    </xs:complexContent>
</xs:complexType>
```

Fig. 8E

```xml
<!-- Section A.34 - REMOVE PERSISTENT STATE ITEM (0x0A) -->
<xs:complexType name="RemovePersistentStateItem.type">
   <xs:complexContent>
         <xs:extension base="Action.base"/>
   </xs:complexContent>
</xs:complexType>
<!-- Section A.35 - REMOVE WIDGET (0x87) -->
<xs:complexType name="RemoveWidget.type">
   <xs:complexContent>
         <xs:extension base="Action.base"/>
   </xs:complexContent>
</xs:complexType>
<!-- Section A.36 - RESET WIDGET (0x80) -->
<xs:complexType name="ResetWidget.type">
   <xs:complexContent>
         <xs:extension base="Action.base"/>
   </xs:complexContent>
</xs:complexType>
<!-- Section A.37 - RESUME (0x72) -->
<xs:complexType name="Resume.type">
   <xs:complexContent>
         <xs:extension base="Action.base"/>
   </xs:complexContent>
</xs:complexType>
<!-- Section A.38 - SELECT SERVICE (0x73) -->
<xs:complexType name="SelectService.type">
   <xs:complexContent>
         <xs:extension base="Action.base"/>
   </xs:complexContent>
</xs:complexType>
<!-- Section A.39 - SELECT SERVICE COMPONENT (0x73) -->
<xs:complexType name="SelectServiceComponent.type">
   <xs:complexContent>
         <xs:extension base="Action.base"/>
   </xs:complexContent>
</xs:complexType>
<!-- Section A.40 - SET (0x08) -->
<xs:complexType name="Set.type">
   <xs:complexContent>
         <xs:extension base="Action.base"/>
   </xs:complexContent>
</xs:complexType>
<!-- Section A.41 - SET FOCUS (0x84) -->
<xs:complexType name="SetFocus.type">
   <xs:complexContent>
         <xs:extension base="Action.base"/>
   </xs:complexContent>
</xs:complexType>
<!-- Section A.42 - SET IMMEDIATE (0x09) -->
<xs:complexType name="SetImmediate.type">
   <xs:complexContent>
      <xs:extension base="Action.base">
         <xs:sequence>
            <xs:element name="refIndex" type="RefIndex.type"/>
            <xs:element name="value" type="int32"/>
         </xs:sequence>
      </xs:extension>
   </xs:complexContent>
</xs:complexType>
```

Fig. 8F

```xml
<!-- Section A.43 - SET WIDGET PROPERTY (0x88) -->
<xs:complexType name="SetWidgetProperty.type">
  <xs:complexContent>
        <xs:extension base="Action.base"/>
  </xs:complexContent>
</xs:complexType>
<!-- Section A.44 - SET WIDGET PROPERTY IMMEDIATE (0x89) -->
<xs:complexType name="SetWidgetPropertyImmediate.type">
  <xs:complexContent>
        <xs:extension base="Action.base"/>
  </xs:complexContent>
</xs:complexType>
<!-- Section A.45 - SHOW WIDGET (0x83) -->
<xs:complexType name="ShowWidget.type">
  <xs:complexContent>
        <xs:extension base="Action.base"/>
  </xs:complexContent>
</xs:complexType>
<!-- Section A.46 - START TIMER (0x78) -->
<xs:complexType name="StartTimer.type">
  <xs:complexContent>
    <xs:extension base="Action.base">
      <xs:sequence>
        <xs:element name="timerIndex" type="RefIndex.type"/>
      </xs:sequence>
    </xs:extension>
  </xs:complexContent>
</xs:complexType>
<!-- Section A.47 - STOP TIMER (0x79) -->
<xs:complexType name="StopTimer.type">
  <xs:complexContent>
        <xs:extension base="Action.base"/>
  </xs:complexContent>
</xs:complexType>
<!-- Section A.48 - STRING APPEND (0x62) -->
<xs:complexType name="StringAppend.type">
  <xs:complexContent>
        <xs:extension base="Action.base"/>
  </xs:complexContent>
</xs:complexType>
<!-- Section A.49 - STRING CLEAR (0x61) -->
<xs:complexType name="StringClear.type">
  <xs:complexContent>
        <xs:extension base="Action.base"/>
  </xs:complexContent>
</xs:complexType>
<!-- Section A.50 - STRING EXTRACT (0x63) -->
<xs:complexType name="StringExtract.type">
  <xs:complexContent>
        <xs:extension base="Action.base"/>
  </xs:complexContent>
</xs:complexType>
<!-- Section A.51 - STRING LENGTH (0x60) -->
<xs:complexType name="StringLength.type">
  <xs:complexContent>
        <xs:extension base="Action.base"/>
  </xs:complexContent>
</xs:complexType>
```

Fig. 8G

```xml
<!-- Section A.52 - STRING SEARCH (0x64) -->
<xs:complexType name="StringSearch.type">
    <xs:complexContent>
        <xs:extension base="Action.base"/>
    </xs:complexContent>
</xs:complexType>
<!-- Section A.53 - SUBMIT FORM (0x77) -->
<xs:complexType name="SubmitForm.type">
    <xs:complexContent>
        <xs:extension base="Action.base"/>
    </xs:complexContent>
</xs:complexType>
<!-- Section A.54 - SUBTRACT (0x12) -->
<xs:complexType name="Subtract.type">
    <xs:complexContent>
        <xs:extension base="Action.base"/>
    </xs:complexContent>
</xs:complexType>
<!-- Section A.55 - SUBTRACT IMMEDIATE (0x13) -->
<xs:complexType name="SubtractImmediate.type">
    <xs:complexContent>
        <xs:extension base="Action.base"/>
    </xs:complexContent>
</xs:complexType>
<!-- Section A.56 - SUSPEND (0x71) -->
<xs:complexType name="Suspend.type">
    <xs:complexContent>
        <xs:extension base="Action.base"/>
    </xs:complexContent>
</xs:complexType>
<!-- Section A.57 - TERMINATE (0x70) -->
<xs:complexType name="Terminate.type">
    <xs:complexContent>
        <xs:extension base="Action.base"/>
    </xs:complexContent>
</xs:complexType>
<!-- Section A.58 - TEST (0x06) -->
<xs:complexType name="Test.type">
    <xs:complexContent>
        <xs:extension base="Action.base"/>
    </xs:complexContent>
</xs:complexType>
<!-- Section A.59 - TEST IMMEDIATE (0x07) -->
<xs:complexType name="TestImmediate.type">
    <xs:complexContent>
        <xs:extension base="Action.base"/>
    </xs:complexContent>
</xs:complexType>
</xs:schema>
```

Fig. 8H

VALIDATION OF CONTENT

CROSS REFERENCE TO RELATED APPLICATIONS

The present application is a continuation of and claims priority to co-pending U.S. patent application Ser. No. 16/740,921, filed Jan. 13, 2020, and titled "Validation of Content"; which is a continuation of and claims priority to U.S. patent application Ser. No. 16/119,184 (now U.S. Pat. No. 10,575,070), filed Aug. 31, 2018, and titled "Validation of Content," which is a continuation of and claims priority to U.S. patent application Ser. No. 15/147,336 (now U.S. Pat. No. 10,110,973), filed May 5, 2016, and titled "Validation of Content"; which is a continuation of and claims priority to U.S. patent application Ser. No. 12/877,492 (now U.S. Pat. No. 9,414,022), filed Sep. 8, 2010, and titled "Verification of Semantic Constraints in Multimedia Data and in its Announcement, Signaling and Interchange"; which is a continuation of and claims priority to U.S. patent application Ser. No. 11/381,508 (now U.S. Pat. No. 7,818,667), filed May 3, 2006, and titled "Verification of Semantic Constraints in Multimedia Data and in its Announcement, Signaling and Interchange"; which claims priority to and is a non-provisional of U.S. provisional patent application Ser. No. 60/677,759, filed May 3, 2005, and which is also a continuation-in-part of and claims priority to U.S. patent application Ser. No. 11/253,892 (now U.S. Pat. No. 7,805,746), filed Oct. 18, 2005, and titled "Optimized Application on-the-wire Format for Construction, Delivery and Display of iTV Content". Each of the above identified applications and patents are incorporated by reference in its entirety. In addition, the following patent applications, each of which is assigned to the assignee of the present invention, are incorporated herein by reference:

1. U.S. patent application Ser. No. 10/390,064, entitled "SYSTEM AND METHOD FOR CONSTRUCTION, DELIVERY AND DISPLAY OF iTV CONTENT", filed Mar. 14, 2003;
2. U.S. patent application Ser. No. 10/630,815, entitled "SYSTEM AND METHOD FOR CONSTRUCTION, DELIVERY AND DISPLAY OF iTV CONTENT", filed Jul. 29, 2003; and
3. U.S. patent application Ser. No. 10/933,845, entitled "SYSTEM AND METHOD FOR PREFERRED PLACEMENT PROGRAMMING OF iTV CONTENT", filed Sep. 2, 2004.

FIELD OF THE INVENTION

The present invention relates to systems and methods for delivery of enhanced television content to subscribers, and in particular relates to the conversion of binary encoded multimedia data components into extensible markup language (XML) files.

BACKGROUND OF THE INVENTION

Interactive television (iTV) is currently available in varying forms and there is perhaps no single, universally accepted definition for this term. Most, however, would agree that iTV systems combine, in some form or other, the passive viewing experience of traditional TV viewing with the interactive nature of external data and content sources such as the World Wide Web. Thus, in different implementations, iTV might allow viewers (perhaps more appropriately termed subscribers) to review local news headlines or weather forecasts while watching their favorite television shows, to chat with other viewers about the latest plot twists, and/or to search for an obtain enhanced content regarding a currently televised program. Many cable and satellite TV providers have deployed iTV systems that allow subscribers to order products seen in commercials or video on demand presentations with the click of a remote control button. And certainly all iTV systems have a version of an interactive program guide that allows subscribers to learn about and select desired programming.

A specific service offered within the iTV landscape is enhanced TV (ETV) broadcasting that provides interactive content linked to video programming. A user can request information on products within ads, access additional program information such as sports statistics, or otherwise interact with a television broadcast such as a game or reality based show. This functionality is achieved through the execution and transmission of an ETV application and corresponding data sent in the broadcast channel or other mechanism along with the video broadcast.

These and other iTV services are deployed as a set of applications over the service provider's network. Such applications are received at the subscriber's premises via a set-top box or similar device, where they are interpreted (compiled), executed and the corresponding data is displayed on a television.

Many applications may be presented to end users via a common user interface and order/transaction entry and tracking system. However, each application has specific integration, management and distribution issues that arise depending on the environment that the network operators choose to deploy and significant problems are experienced by application providers and distributors in deploying and managing their ETV applications as a result. Stated differently, application providers and distributors face problems in developing and managing their ETV applications because there exists a proliferation of technologies and standards for the delivery of ETV applications and different network operators have chosen to deploy different combinations of these technologies. For example, ETV application providers must cope with networks that have been cobbled together with different technologies such as:

1. Head-end technology from different providers.
2. Set-top boxes from different manufacturers.
3. Various combinations of network topologies.
4. Middleware from different providers.
5. VOD servers from a variety of providers and vendors.
6. Billing systems from multiple different companies.
7. Conditional access systems from different vendors.
8. Differing implementation standards such as HTML, XHTML, XML, Ecmascript, OCAP, MHP, ATVEF, DASE, etc.
9. Various programming languages, such as Java, C, C++, etc.

Content providers and application developers must navigate through this maze of often incompatible and unique combinations of equipment, technologies and standards, and often must develop a unique and different application for each such combination that they wish to target. For their part, network operators must deploy, configure, manage and operate ETV applications on each different network configuration individually, increasing cost, complexity, and staffing needs, while reducing the number of service that can be deployed, and the quality of those services.

Another significant problem for the deployment of ETV applications in the United States is that the majority of in-service set-top boxes have relatively limited capabilities with which to store and process ETV applications. For example, many distributed applications may not be executable on various set-top boxes due to the memory and processing requirements to compile or otherwise interpret the application and data for proper display. These set-top limitations make it very difficult to support the features, functions and viewer response times for ETV applications that are required for a compelling and rich user experience.

SUMMARY OF THE INVENTION

In one embodiment, the present invention provides for converting a binary encoded multimedia data into an XML file, and validating the XML file according to a predetermined XML or other schemas. Following validation, the binary information may be subject to further processing. The binary encoded multimedia data may exist in a streaming format, such as an MPEG-2 transport stream, or an AVC broadcast stream. Validating the XML file may involve validating broadcast video elementary stream formats, validating PMT information; or validating the XML file according to one or more MPEG protocols, MHP protocols, or CableLabs OpenCable.™. protocols (or other communication protocols) and/or one or more predefined standards such as those promulgated by or for DVB (including but not limited to DVB-T or DVB-H), ATSC, SCTE, ANSI, IETF, ISO, or SMPTE. Such validation may occur at a computer system remote from where the binary information is stored and/or converted to XML.

In a further embodiment, the present invention permits the conversion of a collection of well-formed, but possibly semantically invalid, binary encoded multimedia data components or packages as well as the binary encoded announcement, signaling, and interchange protocols used in their transmission into one or more well-formed XML files. Such XML files may then be validated according to one or more pre-defined XML schemas, or similar schema languages such as RELAX NG schemas, in order to verify that the data and protocol structures and substructures adhere to prior defined semantic constraints.

BRIEF DESCRIPTION OF THE DRAWINGS

The present invention is illustrated by way of example and not limitation in the figures of the accompanying drawings, in which:

FIGS. 2A-2C, collectively, present an example of an XML schema that defines and processes widgets according to an embodiment of the present invention.

FIGS. 3A-3D, collectively, present an example of an XML schema that defines and processes tables according to an embodiment of the present invention.

FIGS. 4A-4D, collectively, present an example of an XML schema that defines and processes structures according to an embodiment of the present invention.

FIG. 5 presents an example of an XML schema that defines and processes refs according to an embodiment of the present invention.

FIGS. 6A-6E, collectively, present an example of an XML schema that defines and processes primitives according to an embodiment of the present invention.

FIGS. 7A-7B, collectively, present an example of an XML schema that defines and processes EBIFX according to an embodiment of the present invention.

FIG. 7C presents an example of an XML schema that defines and processes another EBIFX according to a further embodiment of the present invention.

FIGS. 8A-8H, collectively, present an example of an XML schema that defines and processes Actions according to yet another embodiment of the present invention.

DETAILED DESCRIPTION

Figure 1:
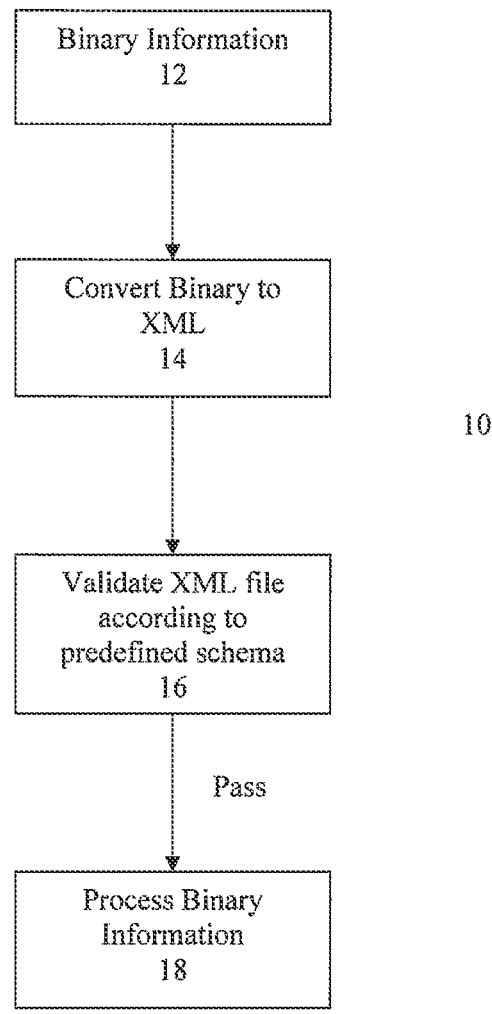
FIG. 1 illustrates a method of converting a binary file to an XML file for validation or other purposes according to an embodiment of the present invention.

The present invention permits the conversion of a collection of well-formed, but possibly semantically invalid, binary encoded multimedia data components or packages as well as the binary encoded announcement, signaling, and interchange protocols used in their transmission into one or more well-formed XML files. Such XML files may then be validated according to one or more pre-defined XML schemas, or similar schema languages such as RELAX NG schemas, in order to verify that the data and protocol structures and substructures adhere to each prior defined semantic constraint. For example, such validation could determine whether a field's value is an acceptable value according to its defined type, whether a co-occurrence constraint is satisfied, if field x is in range [x0, x1] then field y must be in range [y0, y1], etc.

The above-cited patent applications describe a system wherein iTV content is created and deployed using a particular authoring specification that provides for the presentation of content through one or more templates. This allows application definition and behavior to remain common across multiple client device types, middleware platforms, and/or iTV operating environments. Of course, many other forms of content creation and distribution exist and the present invention is not limited to the schemes discussed in the above-cited patent applications. Subsequent to distributing content (or as part of the distribution chain), and prior to execution or consumption of the content, it is useful to validate it to ensure compliance with various protocols, standards formats or other pre-defined semantic constraints.

Any standard or specification for formatting content can be expressed as an XML schema; hence, in accordance with the present invention the binary encoded multimedia data is converted to XML content governed by a pre-defined schema and then validated according to rules defining that schema. As illustrated in FIG. 1, the present invention provides a method 10 for the conversion of binary information (data) 12 into an XML format for purposes of validation before being subject to further processing. The binary encoded data may be multimedia (e.g., audio/video) data that exists in a streaming format, such as an MPEG-2 transport stream, or an AVC broadcast stream. Such data binary data may be generated or harvested from any of a number of data feeds from various content providers (e.g., via the Internet or audio/video distribution systems). In some cases, following validation the binary information may be delivered a set top box associated with a cable or satellite audio/video distribution network.

As indicated above, following the conversion 14 of the binary information the resulting XML file may be validated 16 according to one or more pre-defined XML schemas and/or XML processing tools (e.g., such as Xpath), or similar XML schema languages (e.g., such as RELAX NG). Such validation may occur at a computer system remote from where the binary information is located and/or converted to the XML file. In such cases, the XML file would be transmitted to the remote computer system for prior to the validation operations.

Validating the XML file may involve validating broadcast video elementary stream formats, validating PMT information; or validating the XML file according to one or more MPEG protocols, MHP protocols, or CableLabs OpenCable™ protocols and/or one or more standards such as those promulgated by or for DVB (including but not limited to DVB-T or DVB-H), ATSC, SCTE, ANSI, IETF, ISO, or SMPTE. Assuming the validation indicates that the binary information is correct, the binary information may be subject to further processing 18 (e.g., processing by a set top box). The validation of the XML files may be performed in order to ensure that the binary data and protocol structures adhere to pre-defined semantic constraints.

The XML schemas presented herein are examples of an expression of the ETV binary exchange format (EBIF) described in the above-cited patent applications. The following capabilities provide examples of uses to which the converted XML content from the binary encoded content can be applied:
1. Allows for validation of binary encoded content subsequent to distribution (or in the distribution chain) and prior to execution.
2. Provides an interchange format between BIF generators, validation tools, editing tools, etc.
3. Aids with source level debugging for execution, display and debugging of BIF applications. For example, validating the XML file produces validated XML content and the validated XML content may be used as a debugging aid.
4. Provides an extensibility aid for migration to later versions of BIF by migrating BIF applications in XML representations. For example, validating the XML file produces validated XML content and the validated XML content may be converted to another version of the XML schema, and the converted XML content used to create binary multimedia data compliant with another protocol version of binary encoded content. EBIF is one example of binary encoded content and the present invention is not limited thereto. The remainder of this description sets forth some specific examples of the present XML schemas for use in interchanging, decoding, and rendering ETV applications.

Widgets: FIGS. 2A-2C, collectively, present an example of an XML schema that defines and processes widgets according to an embodiment of the present invention. A widget is a user interface construct that is typically, but not necessarily associated with some direct presentation semantic; e.g., a button widget and an input text field widget have presentation semantics, whereas a hidden field widget and a timer widget do not. A widget may be specified by a set of static properties necessary to construct an instance of the widget in a user agent (or authoring station). A widget may also be associated with a set of dynamic properties that may change value as a consequence of user events, system events, or programmatic actions applied to the widget (e.g., mutating the value of a widget under control of a logic programming construct).

Tables: FIGS. 3A-3D, collectively, present an example of an XML schema that defines and processes tables according to an embodiment of the present invention.

Structure: FIGS. 4A-4D, collectively, present an example of an XML schema that defines and processes structures according to an embodiment of the present invention.

Refs: FIG. 5 presents an example of an XML schema that defines and processes refs according to an embodiment of the present invention.

Primitives: FIGS. 6A-6E, collectively, present an example of an XML schema that defines and processes primitives according to an embodiment of the present invention.

EBIFX: FIGS. 7A-7B, collectively, present an example of an XML schema that defines and processes EBIFX according to an embodiment of the present invention. FIG. 7C presents an example of an XML schema that defines and processes another EBIFX according to a further embodiment of the present invention.

Actions: FIGS. 8A-8H, collectively, present an example of an XML schema that defines and processes Actions according to yet another embodiment of the present invention.

Thus, systems and method that provide for conversion of binary encoded multimedia data components into extensible markup language (XML) files have been described. In one embodiment, the present invention provides for converting a binary encoded multimedia data into an extensible markup language (XML) file, and validating the XML file according to a predetermined XML or other schema. Assuming the validation passes, the binary information may then be subject to further processing. The binary encoded multimedia data may exist in a streaming format, such as an MPEG-2 transport stream, or an AVC broadcast stream. Validating the XML file may involve validating broadcast video elementary stream formats, validating PMT information; or validating the XML file according to one or more protocols and/or standards-defined formats.

Although the present invention has been discussed with respect to several illustrated embodiments, these examples should not be read as limited the scope of the invention, which is best understood by reference to the claims, which follow.

The invention claimed is:

1. An apparatus comprising:
one or more processors; and
memory storing instructions that, when executed by the one or more processors, cause the apparatus to:
generate, based on encoded video, markup language content, wherein the encoded video comprises video data that is associated with one or more formatting rules;
determine, based on validation of the markup language content according to a first schema based on the one or more formatting rules, that the encoded video adheres to the one or more formatting rules;
based on a determination that the encoded video adheres to the one of more formatting rules, generate an instance of a widget associated with the encoded video; and
send, to one or more devices, the instance of the widget.

2. The apparatus of claim 1, wherein the instructions, when executed by the one or more processors, cause the apparatus to:
generate, based on the validation of the markup language content, a second schema; and
process, based on the second schema, the instance of the widget.

3. The apparatus of claim 1, wherein the instance of the widget is associated with a presentation semantic.

4. The apparatus of claim 1, wherein the widget comprises one of a button widget, an input text field widget, a hidden field widget, or a timer widget.

5. The apparatus of claim 1, wherein the instructions, when executed by the one or more processors, cause the apparatus to:
determine an action applied to the instance of the widget;

generate, based on the action and based on the validation of the markup language content, a second instance of the widget; and send, to one or more devices, the second instance of the widget.

6. The apparatus of claim 1, wherein the markup language content comprises extensible markup language (XML) content.

7. The apparatus of claim 1, wherein the one or more formatting rules comprise a version of an enhanced television binary interchange format (EBIF), comprise a version of Motion Pictures Expert Group (MPEG), comprise a version of Digital Video Broadcasting (DVB), or are associated with OPENCABLE.

8. A non-transitory computer-readable medium storing instructions that, when executed, cause:

generating, based on encoded video, markup language content, wherein the encoded video comprises video data that is associated with one or more formatting rules;

determining, based on validation of the markup language content according to a first schema based on the one or more formatting rules, that the encoded video adheres to the one or more formatting rules;

based on a determination that the encoded video adheres to the one of more formatting rules, generating an instance of a widget associated with the encoded video; and sending, to one or more devices, the instance of the widget.

9. The non-transitory computer-readable medium of claim 8, wherein the instructions, when executed, further cause:

generating, based on the validation of the markup language content, a second schema; and processing, based on the second schema, the instance of the widget.

10. The non-transitory computer-readable medium of claim 8, wherein the instance of the widget is associated with a presentation semantic.

11. The non-transitory computer-readable medium of claim 8, wherein the widget comprises one of a button widget, an input text field widget, a hidden field widget, or a timer widget.

12. The non-transitory computer-readable medium of claim 8, wherein the instructions, when executed, cause:

determining an action applied to the instance of the widget;

generating, based on the action and based on the validation of the markup language content, a second instance of the widget; and sending, to one or more devices, the second instance of the widget.

13. The non-transitory computer-readable medium of claim 8, wherein the markup language content comprises extensible markup language (XML) content.

14. The non-transitory computer-readable medium of claim 8, wherein the one or more formatting rules comprise a version of an enhanced television binary interchange format (EBIF), comprise a version of Motion Pictures Expert Group (MPEG), comprise a version of Digital Video Broadcasting (DVB), or are associated with OPENCABLE.

15. A system comprising:

a user device; and a computing device, wherein the computing device is configured to:

generate, based on encoded video, markup language content, wherein the encoded video comprises video data that is associated with one or more formatting rules;

determine, based on validation of the markup language content according to a first schema based on the one or more formatting rules, that the encoded video adheres to the one or more formatting rules;

based on a determination that the encoded video adheres to the one of more formatting rules, generate an instance of a widget associated with the encoded video; and send, to the user device, the instance of the widget.

16. The system of claim 15, wherein the computing device is further configured to:

generate, based on the validation of the markup language content, a second schema; and process, based on the second schema, the instance of the widget.

17. The system of claim 15, wherein the instance of the widget is associated with a presentation semantic.

18. The system of claim 15, wherein the widget comprises one of a button widget, an input text field widget, a hidden field widget, or a timer widget.

19. The system of claim 15, wherein the computing device is further configured to:

determine an action applied to the instance of the widget;

generate, based on the action and based on the validation of the markup language content, a second instance of the widget; and send, to one or more devices, the second instance of the widget.

20. The system of claim 15, wherein the markup language content comprises extensible markup language (XML) content.

21. The system of claim 15, wherein the one or more formatting rules comprise a version of an enhanced television binary interchange format (EBIF), comprise a version of Motion Pictures Expert Group (MPEG), comprise a version of Digital Video Broadcasting (DVB), or are associated with OPENCABLE.

* * * * *